United States Patent
Gundlach et al.

[11] Patent Number: 6,054,505
[45] Date of Patent: Apr. 25, 2000

[54] INK COMPOSITIONS WITH IMPROVED SHELF STABILITY

[75] Inventors: Kurt B. Gundlach; Luis A. Sanchez, both of Fairport; Richard L. Colt; Maura A. Sweeney, both of Rochester; William M. Schwarz, Jr., Webster, all of N.Y.

[73] Assignee: Xerox Corporation, Stamford, Conn.

[21] Appl. No.: 09/046,852

[22] Filed: Mar. 24, 1998

[51] Int. Cl.⁷ .............................. C08K 3/10; C08K 3/28; C08L 39/04; C08L 39/06

[52] U.S. Cl. .................................................. 523/160

[58] Field of Search ..................... 523/160, 161; 106/31.13, 31.27, 31.28, 31.58, 31.43, 31.49; 526/258, 263, 264; 524/548, 555, 567

[56] References Cited

U.S. PATENT DOCUMENTS

| | | | |
|---|---|---|---|
| 4,197,135 | 4/1980 | Bailey et al. | 106/23 |
| 4,267,088 | 5/1981 | Kempf | 260/29.2 EP |
| 4,659,382 | 4/1987 | Kang | 106/22 |
| 4,961,785 | 10/1990 | Skene et al. | 106/22 |
| 5,019,164 | 5/1991 | Tomita et al. | 106/31.43 |
| 5,019,166 | 5/1991 | Schwarz | 106/31.43 |
| 5,091,005 | 2/1992 | Mueller et al. | 106/22 |
| 5,156,675 | 10/1992 | Breton et al. | 106/31.43 |
| 5,223,338 | 6/1993 | Malhotra | 428/342 |
| 5,250,107 | 10/1993 | Bares | 106/20 R |
| 5,292,441 | 3/1994 | Chen et al. | 210/735 |
| 5,509,957 | 4/1996 | Toan et al. | 106/31.43 |
| 5,518,534 | 5/1996 | Pearlstine et al. | 106/31.75 |
| 5,618,338 | 4/1997 | Kurabayshi et al. | 106/31.37 |
| 5,667,572 | 9/1997 | Taniguchi et al. | 106/31.36 |
| 5,698,478 | 12/1997 | Yamamoto et al. | 442/153 |
| 5,709,737 | 1/1998 | Malhotra et al. | 106/31.43 |
| 5,788,753 | 8/1998 | Pawlowski et al. | 106/31.43 |
| 5,853,469 | 12/1998 | Colt et al. | 106/31.49 |
| 5,861,447 | 1/1999 | Nagasawa et al. | 523/161 |

FOREIGN PATENT DOCUMENTS

| | | |
|---|---|---|
| 0874028 | 10/1998 | European Pat. Off. . |
| 0911974 | 4/1999 | European Pat. Off. . |
| 57-198768 | 12/1982 | Japan . |
| 08009701 | 1/1996 | Japan . |

OTHER PUBLICATIONS

Lewis Sr., Richard J.; Hawley's Condensed Chemical Dictionary 13th Ed., John Wiley and Sons, New York (p. 949), 1997.

Morrison, Robert Thornton and Boyd, Robert Neilson; Organic Chemistry 5th Ed., Allyn and Bacon, Boston (p. 960), 1987.

*Primary Examiner*—Vasu Jagannathan
*Assistant Examiner*—Callie E. Shosko
*Attorney, Agent, or Firm*—Judith L. Byorick

[57] ABSTRACT

Disclosed is an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

20 Claims, No Drawings

INK COMPOSITIONS WITH IMPROVED SHELF STABILITY

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises (1) water; (2) a nonpolymeric salt comprising at least one cation and at least one anion; and (3) a colorant comprising an anionic dye complexed with a polyquaternary amine compound. Another embodiment of the present invention is directed to an ink composition which comprises (1) water; (2) a nonpolymeric salt comprising at least one cation and at least one anion; (3) an anionic dye; and (4) a polyquaternary amine compound. In one specific embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J.*
*Appl. Phys.*, vol. 65, no. 9 (May 1, 1989) and references therein, the disclosure of which is totally incorporated herein by reference.

U.S. Pat. No. 5,250,107 (Bares), the disclosure of which is totally incorporated herein by reference, discloses a waterfast ink composition and method for making the same. A selected chemical dye having at least one functional group with an extractable hydrogen atom thereon (e.g. —COOH, —NH$_2$, or —OH) is combined with an ammonium zirconium polymer salt (e.g. ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex which is stable and water-fast. The mixture may be dispensed onto a variety of substrates (e.g. paper) using thermal ink jet or other printing systems.

U.S. Pat. No. 4,267,088 (Kempf), the disclosure of which is totally incorporated herein by reference, discloses coatings particularly useful as marking inks in which an epichlorohydrin-modified polyethyleneimine and an ethylene oxide-modified polyethyleneimine cooperate in aqueous solution to form a composition capable of application to form deposits adherent to most materials and resistant to most organic solvents but readily removable by water.

U.S. Pat. No. 4,197,135 (Bailey et al.), the disclosure of which is totally incorporated herein by reference, discloses an ink for use in ink jet printers containing a water soluble dye and a polyamine containing 7 or more nitrogen atoms per molecule, with the ink composition having a pH of 8 or above, the upper pH limit being dye decomposition dependent. The ink has improved waterfastness over an equivalent ink formulation without the polyamine additive.

U.S. Pat. No. 4,659,382 (Kang), the disclosure of which is totally incorporated herein by reference, discloses an ink jet ink composition comprising a major amount of water, a hydroxyethylated polyethyleneimine polymer, and a dye component, wherein the polymer has incorporated therein from about 65 to about 80 percent by weight of hydroxyethyl groups.

U.S. Pat. No. 5,091,005 (Mueller et al.), the disclosure of which is totally incorporated herein by reference, discloses inks comprising, by weight, from about 4% to about 10% formamide, from about 1% to about 10% dye, and the balance water when printed on paper from an ink-jet printer have improved resistance to bleed, especially when printed at a rate up to about 3.7 kHz.

U.S. Pat. No. 4,961,785 (Skene et al.), the disclosure of which is totally incorporated herein by reference, discloses inks for ink-jet printing have improved smear resistance when they contain from about 15 to 50%, preferably from about 20% to about 30%, formamide.

Japanese Patent publication 57-198768, the disclosure of which is totally incorporated herein by reference, discloses a type of water-base ink made of acidic dye and/or direct dye, cationic water-soluble resin, water-soluble organic solvent, and water.

Copending application U.S. Ser. No. 09/046895, filed concurrently herewith, entitled "Ink Compositions and Multicolor Thermal Ink Jet Printing Process for the Production of High Quality Images," with the named inventor John Wei-Ping Lin, the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 09/047097, filed concurrently herewith, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 09/046849, filed concurrently herewith, entitled "Ink Compositions Containing Cationic Amido Amine Polymers", with the named inventor William M. Schwarz, the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

Copending application U.S. Ser. No. 09/047278, filed concurrently herewith, entitled "Ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

While known compositions and processes are suitable for their intended purposes, a need remains for improved ink compositions suitable for ink jet printing processes. In addition, a need remains for ink compositions with improved waterfastness. Further, a need remains for ink compositions with improved wet smear resistance. Additionally, a need remains for ink compositions with reduced intercolor bleed when two or more colors are printed adjacent to each other. There is also a need for ink compositions for ink jet printing which contain acid dyes, which enable advantages such as bright colors, low cost, and high waterfastness when complexed with cationic polymers. In addition, there is a need for ink compositions with improved shelf stability. Further, there is a need for ink compositions with improved jetting characteristics. Additionally, there is a need for ink compositions which exhibit excellent smear resistance. A need also remains for ink compositions which are heat stable. In addition, a need remains for ink compositions which exhibit freeze/thaw stability. Further, a need remains for ink compositions suitable for use in ink jet printing processes and having relatively low viscosities. Additionally, a need remains for ink compositions with improved lightfastness.

SUMMARY OF THE INVENTION

It is an object of the present invention to provide ink compositions with the above noted advantages.

It is another object of the present invention to provide improved ink compositions suitable for ink jet printing processes.

It is yet another object of the present invention to provide ink compositions with improved waterfastness.

It is still another object of the present invention to provide ink compositions with improved wet smear resistance.

Another object of the present invention is to provide ink compositions with reduced intercolor bleed when two or more colors are printed adjacent to each other.

Yet another object of the present invention is to provide ink compositions for ink jet printing which contain acid dyes, which enable advantages such as bright colors, low cost, and high waterfastness when complexed with cationic polymers.

Still another object of the present invention is to provide ink compositions with improved shelf stability.

It is another object of the present invention to provide ink compositions with improved jetting characteristics.

It is yet another object of the present invention to provide ink compositions which exhibit excellent smear resistance.

It is still another object of the present invention to provide ink compositions which are heat stable.

Another object of the present invention is to provide ink compositions which exhibit freeze/thaw stability.

Yet another object of the present invention is to provide ink compositions suitable for use in ink jet printing processes and having relatively low viscosities.

Still another object of the present invention is to provide ink compositions with improved lightfastness.

These and other objects of the present invention (or specific embodiments thereof) can be achieved by providing an ink composition which comprises (1) water; (2) a nonpolymeric salt comprising at least one cation and at least one anion; and (3) a colorant comprising an anionic dye complexed with a polyquaternary amine compound. Another embodiment of the present invention is directed to an ink composition which comprises (1) water; (2) a nonpolymeric salt comprising at least one cation and at least one anion; (3) an anionic dye; and (4) a polyquaternary amine compound. In one specific embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

DETAILED DESCRIPTION OF THE INVENTION

Inks of the present invention contain an aqueous liquid vehicle, a nonpolymeric salt comprising at least one cation and at least one anion, an anionic dye, and a polyquaternary amine compound. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The polyquaternary amine compound, which generally is complexed with the anionic dye, is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

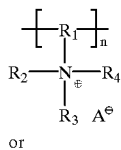

or

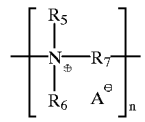

wherein n is an integer representing the number of repeat monomer units, $R_1$ is an alkylene group, including saturated, unsaturated, cyclic, and substituted alkylene groups (including polymethylene oxide groups, polyethylene oxide groups, polypropylene oxide groups, and the like), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, or an arylalkylene group, including substituted arylalkylene groups, typically with from 7 to about 60 carbon atoms and preferably with from 7 to about 20 carbon atoms, and $R_2$, $R_3$, $R_4$, $R_5$, $R_6$, and $R_7$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, alkylene, aryl, arylene, arylalkyl, and arylalkylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring.

Examples of suitable polyquaternary amine compounds include polydiallyl ammonium compounds, of the general formula

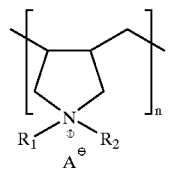

wherein n is an integer representing the number of repeat monomer units, $R_1$ and $R_2$ each, independently of the other, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, or arylalkyl groups, including substituted arylalkyl groups, typically with from about 7 to about 60 carbon atoms and preferably with from 7 to about 20 carbon atoms, wherein the substituents on the substituted alkyl aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, such as polydiallyl dimethyl ammonium compounds, including polydiallyl dimethyl ammonium chloride, of the formula

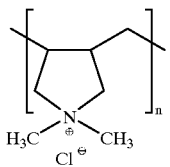

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

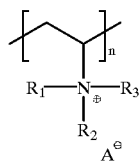

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Also suitable are polyquaternized polyallylamines, of the general formula

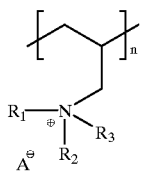

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pydidinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Also suitable are epichlorohydrin/amine copolymers, including those of the general formula

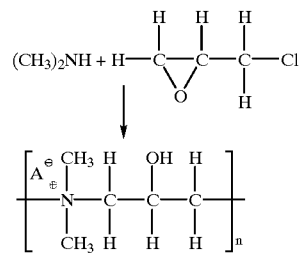

wherein n is an integer of from about 3 to about 3,000, and preferably from about 5 to about 100, although the value can be outside of these ranges, and A is any suitable or desired anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like. Polymers of this formula are commercially available from Hercules, Wilmington, DE as RETEN 200 or RETEN 201 (molecular weight generally less than 10,000), and from Cytex, Inc., West Patterson, N.J., as CYPRO 514, 515, and 516 (wherein the polymers have a molecular weight range of from about 75,000 to about 250,000 and n is from about 870 to about 3,000), and as SUPERFLOC C567 (wherein the polymer has a molecular weight of about 10,000 and n is from about 110 to about 120, typically about 116).

Also suitable are cationic amido amine copolymers. Examples of suitable cationic amido amine copolymers include those of the general formula $$(A-B)_n^{2n+} \cdot 2nX^-$$

wherein X is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

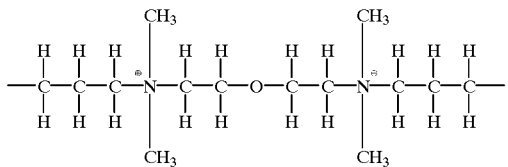

and "B" is selected from the group consisting of (a) monomers of the formula

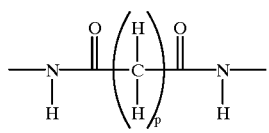

wherein p is an integer representing the number of repeat monomer units, and typically is from 1 to about 12, preferably from 1 to about 7, and more preferably from 1 to about 4, although the value can be outside of these ranges, such as (i) azeleic acid diamido, wherein p is 7, of the formula

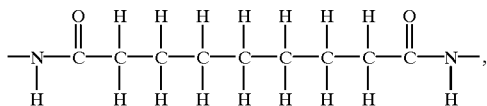

or (ii) adipic acid diamido, wherein p is 4, of the formula

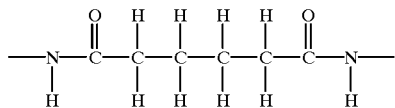

and (b) ureido, of the formula

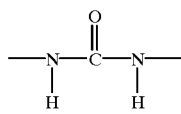

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azeleic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260.

Also suitable are copolymers of vinyl pyrrolidinone and a vinyl imidazolium salt. In one embodiment, the copolymer is of a vinyl imidazolium salt of the formula

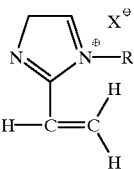

wherein X is an anion and R is a hydrogen atom or an alkyl group, typically with from 1 to about 8 carbon atoms and preferably with from 1 to about 3 carbon atoms, and vinyl pyrrolidinone, of the formula

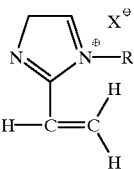

wherein the copolymer is of the general formula

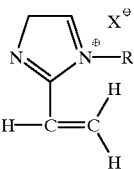

wherein X is any suitable or desired anion, suha Cl$^-$, Br$^-$, I$^-$, HSO$_4^-$, HSO$_3^-$, SO$_4^{2-}$, SO$_3^{2-}$, CH$_2$SO$_3^-$, CH$_3$SO$_3^-$, CH$_3$C$_6$H$_4$SO$_3^-$, NO$_3^-$, HCOO$^-$, CH$_3$COO$^-$, HCO$_3^-$, CO$_3^{2-}$, H$_2$PO$_4^-$, HPO$_4^{2-}$, PO$_4^{3-}$, SCN$^-$, BF$_4^-$, ClO$_4^-$, SSO$_3^-$, or the like, R is a hydrogen atom or an alkyl group, typically with from 1 to about 8 carbon atoms, and preferably with from 1 to about 3 carbon atoms, m is a integer representing the number of repeat vinyl imidazolium units, and n is an integer representing the number of repeat vinyl pyrrolidinone units. When R is a hydrogen atom, the pH of the ink can be adjusted to provide optimal ink-paper interaction; for example, the hydrogen atom can be extracted upon contact with the paper, or the cationic character of the polymer can be adjusted with ink pH. Random copolymers of the above formula generally are preferred, although alternating and block copolymers are also suitable. The weight average molecular weight of the polymer typically is from about 1,000 to about 1,000,000, preferably from about 1,000 to about 100,000, and more preferably from about 2,000 to about 5,000, although the value can be outside of these ranges. The ratio of vinyl imidazolium monomers to vinyl pyrrolidinone monomers typically is from about 99:1 to about 5:95, preferably from about 95:5 to about 20:80, more preferably from about 95:5 to about 30:70, and even more preferably from about 95:5 to about 50:50, although the value can be outside of these ranges. Vinyl pyrrolidinone/vinyl imidazolium salt copolymers are commercially available; for example, BASF, Parsippany, N.J., provides vinyl imidazolium chloride/vinyl pyrrolidinone copolymers (of the above formula wherein R is CH$_3$) with a molecular weight of about 100,000 in three monomer ratios: LUVI-QUAT® FC905 has a vinyl imidazolium chloride:vinyl pyrrolidinone ratio of 95:5 with 6.7 milliequivalents per gram of cationic groups, LUVIQUAT® FC550 has a vinyl imidazolium chloride:vinyl pyrrolidinone ratio of 50:50 with 3.0 milliequivalents per gram of cationic groups, and LUVIQUAT® FC370 has a vinyl imidazolium chloride:vinyl pyrrolidinone ratio of 30:70 with 1.8 milliequivalents per gram of cationic groups. Also available from BASF is LUVIQUAT® HM552, with a molecular weight of about 800,000 and a vinyl imidazolium chloride:vinyl pyrrolidinone ratio of 50:50.

Mixtures of two or more polyquaternary amine compounds can also be present in the ink.

The polyquaternary amine compound is present in the ink in any desired or effective amount, typically from about 0.01 to about 50 percent by weight of the ink, more typically from about 0.05 to about 40 percent by weight of the ink, preferably from about 1 to about 10 percent by weight of the ink, more preferably from about 1 to about 9 percent by weight of the ink, and even more preferably from about 1 to about 5 percent by weight of the ink, although the amount can be outside of these ranges. The preferred relative amounts of polyquaternary amine and anionic dye in the ink can also be expressed as a stoichiometric ratio, with the molar ratio of anionic dye groups to cationic polyquaternary groups typically being from about 1:0.33 to about 1:300, preferably from about 1:1 to about 1:20, more preferably from about 1:2 to about 1:6, and most preferably about 1:3, although the relative amounts can be outside of these ranges.

The anionic dye can be any suitable or desired anionic dye. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155,156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 10 percent by weight of the ink, preferably from about 0.1 to about 7 percent by weight of the ink, and more preferably from about 1 to about 5 percent by weight of the ink, although the amount can be outside of these ranges.

In one embodiment of the present invention, the dye is Acid Red 52. This dye has an orange fluorescence which can be useful for many applications, such as use in the postal industry to determine envelope side. Acid Red 52 alone exhibits poor waterfastness, rendering it unsuitable for this application. When employed in combination with the other ingredients of the inks of the present invention, however, this dye can result in a waterfast and wet smear resistant ink. In a particularly preferred embodiment of the present invention, Acid Red 52 is complexed with polydiallyl dimethyl ammonium chloride. The resulting complex is highly compatible with other ink ingredients and a wide variety of ink cosolvents.

In another embodiment, the dye is a mixture of fluorescein (Acid Yellow 73) and Acid Red 52. Fluorescein has a bright yellow fluorescence and, when mixed with Acid Red 52 dye, makes an ideal ink for postal use. In inks of the present invention, Acid Red 52 appears as a bright cool magenta under visible illumination; illumination of Acid Red 52 with ultraviolet exhibits a dark orange fluoresce. Acid Yellow 73 appears as a very light lemon yellow under visible illumination, with a strong light yellow fluoresce. Neither dye alone yields both an easily read and aesthetically acceptable visible color or an acceptable fluoresce for UV detection. The mixture, however, generates a red-orange color with a bright orange fluoresce. Fluorescein has a molecular weight of about 332.31, an empirical formula of $C_{20}H_{12}O_5$, and a structural formula of

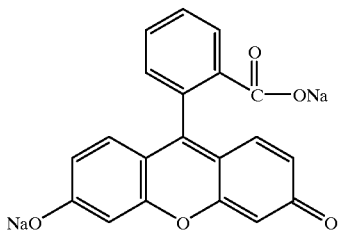

and is commercially available from, for example, Aldrich Chemical Co., Milwaukee, Wis., or from E&M Scientific. The Acid Red 52 dye and fluorescein are present in any desired or effective relative amounts; typically the weight ratio of Acid Red 52 to fluorescein is from about 1:1 to about 1:20, preferably from about 1:2 to about 1:5, and more preferably about 1:3, although the relative amounts can be outside of these ranges.

When the selected anionic dye is Acid Blue 9, the dye/polyquaternary complex can, in some instances, exhibit reduced lightfastness, exhibiting a red-yellow chromophore shift when exposed to visible light irradiation, particularly yellow light. In this instance, the incorporation of a copper phthalo cyan dye, such as Direct Blue 199 or Direct Blue 86, can improve fade resistance of the ink. The inks containing the polyquaternary compound, Acid Blue 9, and a copper phthalo dye exhibit a high degree of both waterfastness and lightfastness. While not being limited to any particular theory, it is believed that the presence of the copper phthalo dye, which absorbs strongly in the yellow-orange region, masks the Acid Blue 9 dye from these wavelengths. In this embodiment, the Acid Blue 9 dye and the copper phthalo dye are present in any desired or effective relative amounts; typically, the relative amounts by weight of Acid Blue 9 to copper phthalo dye are from about 1:100 to about 100:1, preferably from about 1:10 to about 10:1, and more preferably from about 1:5 to about 5:1, although the relative amounts can be outside of these ranges.

While not being limited to any particular theory, it is believed that the polyquaternary amine and the dye form a multidentate ionic complex upon admixing of the ink ingredients. While the ink ingredients can be mixed in any desired order, it is preferred that any salts present in the ink be added prior to addition of the dye or the polyquaternary amine. The structure of the polyquaternary complex generally is independent of ink pH over the normal pH range of the ink.

In one embodiment of the present invention, the ink also contains sulfolane. The sulfolane can increase the solubility of the dye/polyquaternary amine complex in the ink, thereby improving the jetting characteristics of the ink in ink jet printers. When present, the sulfolane is present in the ink in any desired or effective amount, typically from about 1 to about 50 percent by weight of the ink, preferably from about 5 to about 30 percent by weight of the ink, and more preferably from about 10 to about 25 percent by weight of the ink, although the amount can be outside of these ranges.

In another embodiment of the present invention, the ink also contains a monoether glycol and/or cyclohexylpyrrolidinone. Monoether glycol or cyclohexylpyrrolidinone components in the ink are particularly preferred when the selected dye contains a 3,6-disulfonated naphthalene ring substituent, such as Acid Red 249 (5-chloro-2-phenoxyaniline→N-p-tolylsulfonyl H acid), of the formula

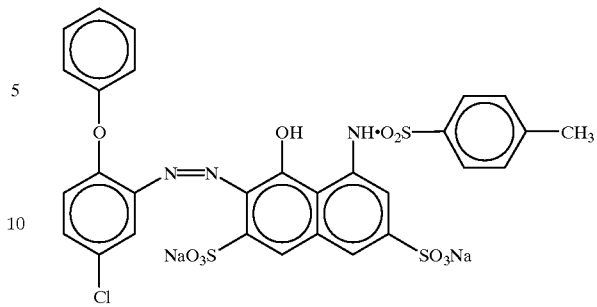

which may lead to precipitation of the dye/polyquaternary complex in some instances in the absence of a monoether glycol. While not being limited to any particular theory, it is believed that the geometry of the sulfonates relative to the quaternary cationic sites can generate strong bidentate binding sites which would not allow for equilibration along the linear cationic polymer chain, and that the solubilizing effects of the glycol monoethers, such as tripropylene glycol monomethyl ether, diethylene glycol monobutyl ether (butyl carbitol), or the like, or cyclohexylpyrrolidinone, can stabilize the dye/polyquaternary complex. Cyclohexylpyrrolidinone is effective in lesser relative amounts in the ink compared to monoether glycols, enables the use of lesser amounts of ionic salts (when present), and enables similar penetration times into plain paper. When present, the monoether glycol is present in the ink in any desired or effective amount, typically from about 1 to about 50 percent by weight of the ink, preferably from about 2 to about 40 percent by weight of the ink, and more preferably from about 3 to about 20 percent by weight of the ink, although the amount can be outside of these ranges. When present, the cyclohexylpyrrolidinone is present in the ink in any desired or effective amount, typically from about 1 to about 30 percent by weight of the ink, preferably from about 2 to about 20 percent by weight of the ink, and more preferably from about 3 to about 15 percent by weight of the ink, although the amount can be outside of these ranges.

In another embodiment of the present invention, the ink also contains formamide and/or dimethyl sulfoxide. Formamide demonstrates excellent solubilization of anionic dyes in neat form, and replacement of other dye solubilizing materials such as urea with formamide and/or DMSO enables improved resistance to hydrolysis in the ink, thereby reducing increase in pH of the ink over time. Inks containing formamide and/or DMSO also exhibit reduced crystallization and reduced viscosity compared to inks containing urea. When present, the formamide is in the ink in any desired or effective amount, typically from about 1 to about 70 percent by weight of the ink, preferably from about 5 to about 50 percent by weight of the ink, and more preferably from about 15 to about 40 percent by weight of the ink, although the amount can be outside of these ranges. When present, the dimethyl sulfoxide is in the ink in any desired or effective amount, typically from about 1 to about 70 percent by weight of the ink, preferably from about 5 to about 50 percent by weight of the ink, and more preferably from about 15 to about 40 percent by weight of the ink, although the amount can be outside of these ranges.

In some embodiments of the present invention, the ink further contains a surfactant. One example of a suitable class of surfactants is that of polyanionic surfactants such as alkyl (linear) diphenyl oxide disulfonates, of the general formula

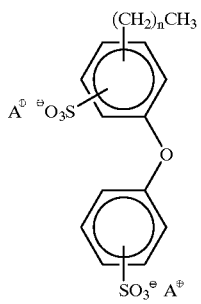

wherein n is an integer, typically of from 1 to about 15 and preferably from 1 to about 10, and A is any desired cation, including (but not limited to) alkali metals and the like. While not being limited to any particular theory, it is believed that the bidentate surfactant can bind ionically to a portion of the polyquaternary compound to encapsulate the dye/polyquaternary complex, thereby shielding it from the hardware surfaces and improving jetting characteristics. The presence of this surfactant enables excellent maintenance capped and extended period decapped recovery in ink jet hardware. An example of this class of surfactant is CALFAX 10L-45, believed to be sodium decyl diphenyl oxide disulfonate, of the formula

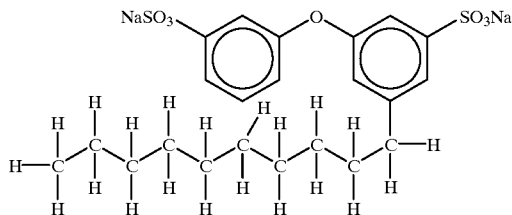

available from Pilot, Santa Fe Springs, Calif. Another example of a suitable class of surfactants is that of nonionic surfactants, including non-ionic esters of ethylene oxide and propylene oxide, such as MERPOL LF-H (believed to be of the formula $CH_3(CH_2)_n(OC_2H_4)_8(OC_3H_6)_8OH$ where n is an integer from about 12 to about 16), available from E.I. Du Pont de Nemours & Co., Wilmington, Del., octylphenoxy polyethoxy ethanols, such as TRITON X-100, available from Union Carbide Co., Danbury, Conn., acetylenic diols such as 2,4,7,9-tetramethyl-5-decyn-4,7-diol and the like, such as SURFYNOL CT-136, available from Air Products & Chemicals Co., Allentown, Pa., trimethyl nonylpolyethylene-glycol ethers, such as TERGITOL TMN-10 (containing 10 oxyethylene units, believed to be of the formula $C_{12}H_{25}O(C_2H_4O)_5H$), available from Union Carbide Co., Danbury, Conn., and the like. While not being limited to any particular theory, these nonionic surfactants are also believed to encapsulate the dye/polyquaternary complex, thereby shielding it from the hardware surfaces and improving jetting characteristics. The presence of these surfactants enables excellent maintenance capped and extended period decapped recovery in ink jet hardware. When present, the surfactant is in the ink in any desired or effective amount, typically from about 0.01 to about 5 percent by weight of the ink, preferably from about 0.1 to about 3 percent by weight of the ink, and more preferably from about 0.3 to about 2 percent by weight of the ink, although the amount can be outside of these ranges.

The inks of the present invention further contain a non-polymeric salt comprising at least one cation and at least one anion. Examples of suitable cations include alkali metal cations, such as $Li^+$, $Na^+$, and $K^+$, alkaline earth metal cations, such as $Mg^{2+}$ and $Ca^{2+}$, nonpolymeric or monomeric ammonium and quaternary amine cations, including those of the general formula

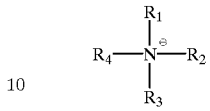

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including $NH_4^+$, $N(CH_3)_4^+$, $H_3NCH_2CH_2NH_3^{2+}$, $(H_3C)_3NCH_2CH_2N(CH_3)_3^{2+}$, imidazolium, quaternized 1,4-diazabicyclo(2.2.2)octane, choline, of the formula

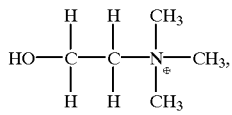

alkyl amine quaternary salts such as ETHOQUAD C/12, of the formula

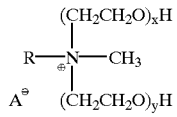

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill., and the like, as well as mixtures thereof. Any desired anion can be employed. Examples of suitable anions include $SO_4^{2-}$, $CO_3^{2-}$, $NO_3^{2-}$, $ClO_4^{2-}$, organic acid anions, such as formate, acetate, propionate, and the like, acetylacetonate, of the formula

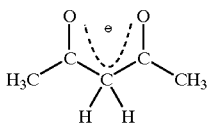

squarate, of the formula

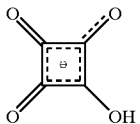

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, 1,4-diazabicyclo(2.2.2)octane salts, such as hexamethonium bromide, of the formula

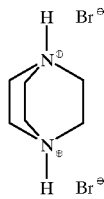

imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt can also be a complex salt, including transition metal complexes such as $Zn(NH_3)_4$ or the like. The salt is present in the ink in any desired or effective amount, typically from about 0.1 to about 40 percent by weight of the ink, preferably from about 0.1 to about 30 percent by weight of the ink, more preferably from about 0.5 to about 20 percent by weight of the ink, and even more preferably from about 2 to about 15 percent by weight of the ink, although the amount can be outside of these ranges. The preferred relative amounts of salt and anionic dye in the ink can also be expressed as a stoichiometric ratio, with the molar ratio of anions in the added salt to anionic dye groups typically being from about 0:1 to about 100:1 for anionic dyes and from about 0:1 to about 500:1 for direct dyes. For all anionic dyes (acid dyes, direct dyes, reactive dyes, and the like), the preferred molar ratio of anions in the added salt to anionic dye groups from about 5:1 to about 100:1, more preferably from about 10:1 to about 80:1. The molar ratio of anions in the added salt to anionic dye groups can, however, be outside of these ranges. In addition, when the anions in the added salt are multivalent, a lesser amount can be employed if desired; for example, if the anions in the added salt are bivalent, the amount added can be reduced to approximately one half of the amount desired for a monovalent anion.

While not being limited to any particular theory, it is believed that the presence of the salt improves the solubility or stability in the ink vehicle of the dye/polyquaternary amine compound complex which is employed as a colorant in the inks of the present invention. More specifically, it is believed that the salt electrostatically shields charges within the polyelectrolye complex constituting the colorant, thereby enabling a more compact structure which in turn is more soluble or stable in the ink vehicle. Again, while not being limited to any particular theory, it is believed that within the ink, the polyquaternary amine is associated with the anionic dye, with the dye playing the role of a counterion. The adjacent charge centers in the polyquaternary amine repel each other and force the polyquaternary amine into a more stretched-out and less soluble backbone configuration. The presence of the salt in the ink is believed to reduce these repulsions, compact the electrical double layer, and promote a more compact, more soluble polyquaternary amine complex. The presence of the salt in the ink can also reduce jitter when the ink is jetted and increase ink surface tension.

In some embodiments of the present invention, lithium is a preferred cation. Again, while not being limited to any particular theory, it is believed that strong ionic associations between the anionic dye and the cationic polymer can cause instability of the colorant complex, resulting in precipitation of the colorant from the ink, and that replacement of the weakly associated cations (such as sodium ions) of the anionic dye with the small, hard lithium cation, which forms tight ion pairs, reduces the ability of the dye to form a strong complex with the cationic polymer.

In other embodiments of the present invention, cations such as quaternary ammonium cations, alkali metal cations, or alkaline earth cations are preferred to reduce undesirable changes in the pH of the ink when the ink is exposed to heat in the printing device.

In other embodiments of the present invention, the salt is one which can be volatilized subsequent to printing. On a substrate such as paper, the cationic charges in the polyquaternary amine compound bind tightly to negative sites on the substrate, such as carboxy ions or the like. While not being limited to any particular theory, it is believed that the anionic dye in turn is captured by the polyquaternary amine compound, thereby enhancing waterfastness of the ink. The salt, on the other hand, can still function as a solubilizing agent and can lead to reduced waterfastness. Accordingly, in some instances it may be desirable to remove the salt from the ink image on the substrate so that the salt is no longer available to aid in removal of the image from the substrate. The salt can be volatilized by any desired or suitable method, such as preheating the substrate prior to printing so that the print is made directly onto a hot substrate, passing the print through a heated area subsequent to printing, such as a hot air blast, an oven, heated fixing rollers (subsequent to air drying of the print to avoid wet smear), allowing the print to lose salts slowly over time by aging them at room temperature, or the like. Most commonly, a decomposition reaction of the salt induced by heat or time occurs to volatilize the salt and remove it from the print. For example, ammonium salts can volatilize to ammonia and other materials as follows:

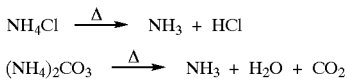

Other ammonium salts, such as ammonium acetate, ammonium formate, ammonium citrate, ammonium EDTA, ammonium bromide, ammonium iodide, other organic amine salts, such as dimethylamine salts, including dimethylammonium chloride and the like, can also be volatilized in a similar manner. Organic salts can also be volatilized by a reverse Menshutkin reaction, as follows:

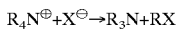

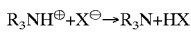

wherein each R group, independently of the others, is hydrogen or an alkyl group, typically with from 1 to about 8 carbon atoms, and wherein two or more R groups can be joined together to form a ring (as in the instances of pyridine, imidazole, or the like), and X is an anion. Complex metal salts such as zinc ammonium carbonate can also be volatilized as follows:

In this instance, the ammonium is tied up as the square planar zinc tetraammonia complex. Decomposition leads to a precipitated zinc oxide. Under somewhat acidic conditions, such as in the presence of a carboxyl group, the zinc ion can participate in ionic crosslinking, thereby enhancing waterfastness further.

In still other embodiments of the present invention, the salt is selected to minimize the viscosity of the ink composition. Water, a major component of the ink compositions, consists of an extensively hydrogen bonded network. Ions dissolved in water become hydrated and either augment or break down this network. Thus, the ions can be thought of as structure makers or structure breakers. With respect to viscosity, structure makers enhance viscosity and structure breakers lower viscosity. Measured viscosities for 1 Molar aqueous solutions of various salts at 25° C. are as follows:

| 1M aqueous solution | $\eta/\eta_{water}$ @25° C. |
|---|---|
| $(CH_3)_4NCl$ | 1.146 |
| $NH_4Cl$ | 0.991 |
| $NH_4NO_3$ | 0.973 |
| $NH_4Br$ | 0.970 |
| $(NH_4)_2SO_4$ | 1.209 |
| KCl | 0.995 |
| KBr | 0.969 |
| KI | 0.936 |
| NaCl | 1.094 |
| $NaNO_3$ | 1.062 |
| $NaClO_4$ | 1.044 |
| LiCl | 1.142 |
| $LiNO_3$ | 1.068 |
| $CaCl_2$ | 1.330 |
| $Ca(NO_3)_2$ | 1.290 |
| $MgCl_2$ | 1.468 |
| $MgSO_4$ | 1.930 |

As the table indicates, the viscosities of various salts can vary significantly; for example, LiCl is more than 17 percent more viscous than $NH_4Br$, and $MgCl_2$ is more than 56 percent more viscous than KI.

In another preferred embodiment, the polyquaternary amine compound is present in the ink in an amount such that the number of quaternary amine groups on the polyquaternary amine compound exceeds the number of anionic groups on the dye. In some instances, particularly when the ink vehicle contains cosolvents such as sulfolane and/or urea and a salt, when the dye and polyquaternary amine compound are present in relative amounts such that the number of anionic groups on the dye exceeds the number of cationic quaternary amine groups on the polymer, precipitation of the dye/polyquaternary amine complex from the ink vehicle can occur. Increasing the amount of polyquaternary amine compound in the ink in these instances enables an ink with excellent shelf stability, excellent waterfastness, excellent smear resistance, and reduced intercolor bleed.

Ink compositions containing increased amounts of polyquaternary amine compound and salt, i.e., at least about 6 percent by weight polyquaternary amine compound and at least about 12 percent by weight salt, also enable advantages such as the ability to formulate inks in the absence of stabilizing cosolvents such as sulfolane and urea. The ability to formulate inks without cosolvents or humectants such as these enables advantages such as increased compatibility of the ink with materials from which printheads are commonly made, improved shelf stability, and the like. Inks containing glycol cosolvents such as dipropylene glycol, tripropylene glycol monomethyl ether, and the like can be formulated without resulting colorant destabilization.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

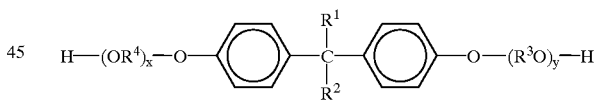

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 3 to about 11, preferably from about 5 to about 10, and more preferably from about 7 to about 8, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. In a preferred embodiment, the ink ingredients are mixed in the following order: (1) water; (2) any salts present in the ink; (3) any cosolvents or humectants present in the ink; (4) polyquaternary compound; (5) dye. If the polyquaternary compound and the dye are added to water prior to addition of salts and/or cosolvents and/or humectants, a precipitated complex may form, which generally will tend to dissolve slowly to homogeneity subsequent to addition of the other ink ingredients.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of the following ingredients:

| Ingredient | Supplier | Amount (grams) |
|---|---|---|
| PROJET YELLOW OAM dye* | Zeneca Colors | 2151.4 |
| sulfolane** | Phillips Petroleum Co. | 600 |
| acetylethanolamine | Scher Chemicals | 480 |
| butyl carbitol | Van Waters & Rogers | 480 |
| urea | Arcadian Corp. | 240 |
| DOWICIL 150/200 biocide | Dow Chemical Co. | 4 |
| polyethylene oxide*** | Polysciences | 2 |
| imidazole | American Biorganics | 40 |
| ethylene diamine tetraacetic acid | Dow Chemical Co. | 2.6 |

*containing 7.5 wt. % Acid Yellow 23 dye in water
**95 wt. % sulfolane, 5 wt. % water
***bisphenol-A derivative, molecular weight 18,500, of the formula

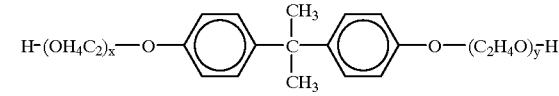

This ink was employed as a control. Additional inks were prepared by adding to the above formulation various amounts of the cationic polyamine resins MIRAPOL A-15 (obtained from Rhone Poulenc, Cranberry, N.J.) and CYPRO 515 (obtained from Cytex, West Patterson, N.J.) and the salts LiCl, $(NH_4)_2SO_4$, and $CaCl_2$ as indicated in the table below. Amounts of the polyamine resins and salts given are percent by weight of the ink composition. The inks thus prepared were coated onto Xerox Image Series LX paper with a #7 Meier rod. The images thus formed were tested for waterfastness by measuring the optical density of the initial image, subsequently immersing the image in water completely for 5 minutes, and measuring the optical density of the image subsequent to water immersion, with waterfastness expressed as a percentage reflecting the before ($D_{max}$) and after ($D_{wf}$) optical densities. The images thus formed were tested for wet smear resistance by abrading the image with a moist felt tip marker and subsequently measuring the optical density of the area below the image ($D_{sm}$). The pressure of the felt tip marker was maintained at 100 grams and excess moisture was removed from the marker tip prior to smearing. Results were as follows:

| cationic polyamine resin | salt | $D_{max}$ | $D_{wf}$ | % WF | $D_{sm}$ |
|---|---|---|---|---|---|
| none (control) | none | 1.00 | 0.40 | 40 | 0.10 |
| MIRAPOL A-15; 2% | LiCl; 1% | 0.92 | 0.72 | 78 | 0.01 |
| MIRAPOL A-15; 1% | LiCl; 1% | 0.94 | 0.65 | 69 | 0.01 |
| CYPRO 515; 2% | LiCl; 4% | 0.90 | 0.64 | 71 | 0.01 |
| CYPRO 515; 2% | $(NH_4)_2SO_4$; 5% | 0.99 | 0.77 | 79 | 0.03 |
| CYPRO 515; 2% | $CaCl_2$ | 0.92 | 0.75 | 82 | 0.04 |
| CYPRO 515; 2% | none | * | * | * | * |
| MIRAPOLA-15; 1% | none | * | * | * | * |

*colorant/cationic polymer complex precipitated from ink; no prints made

As the results indicate, the presence of the cationic polymer increased waterfastness and wet smear resistance, and the presence of the salt enhanced stability of the colorant/cationic polymer complex with respect to precipitation.

EXAMPLE II

An ink composition was prepared by simple mixing of the following ingredients:

| Ingredient | Supplier | Amount (grams) |
|---|---|---|
| deionized water | — | 755.5 |
| tris(hydroxymethyl) aminomethane | American Biorganics Inc. | 3 |
| ethylene diamine tetraacetic acid | Dow Chemical Co. | 2 |
| 261 RV cationic polymer | Calgon | 5 |
| DOWICIL 150/200 biocide | Dow Chemical Co. | 1 |
| polyethylene oxide* | Polysciences | 0.5 |
| sulfolane** | Phillips Petroleum Co. | 63 |
| urea | Aldrich Chemical Co. | 100 |
| lithium chloride | Aldrich Chemical Co. | 10 |
| TRITON X-100 surfactant | Aldrich Chemical Co. | 10 |
| PROJET RED OAM dye*** | Zeneca Colors roll mill 30 minutes | 50 |

*bisphenol-A derivative, molecular weight 18,500, of the formula

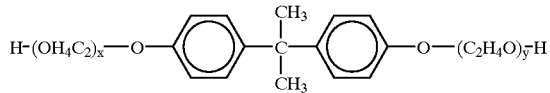

**containing 95 wt. % sulfolane and 5 wt. % water
***aqueous solution containing 10 wt. % dye solids in water The ink was filtered through a 0.2 micron Gelman Nylaflow filter at 20 pounds per square inch over a period of 5 minutes. The resulting ink exhibited a viscosity of 1.63 centipoise at 25° C., a pH of 7.42 at 25° C., a surface tension of 31.4 dynes per centimeter, and a conductivity of 16.8 millimhos. The resulting images exhibited an optical density of 0.82, a waterfastness of 85 percent, calculated as a percentage of optical density after 5 minutes soaking in water with agitation compared to optical density prior to soaking, and a wet smear of 0.01, measured as the optical density of a smeared area on an unprinted area adjacent to a full tone patch, smeared using a wet felt nib under a pressure of 70 grams, with the paper background optical density subtracted.

EXAMPLE III

A black ink composition was prepared by simple mixing of the following ingredients:

| Ingredient | Supplier | Amount (grams) |
|---|---|---|
| deionized water | — | 74.4 |
| tris(hydroxymethyl) aminomethane | American Biorganics Inc. | 1 |
| ethylene diamine tetraacetic acid | Dow Chemical Co. | 0.5 |
| lithium bromide | Aldrich Chemical Co. | 14 |
| sulfolane* | Phillips Petroleum Co. | 12.6 |
| polyethylene oxide** | Polysciences | 0.1 |
| DOWICIL 150/200 biocide | Dow Chemical Co. | 0.2 |
| urea | Aldrich Chemical Co. | 40 |
| VARIKEM 110*** | Calgon | 30 |
| Direct Red 227 dye**** | Tricon Colors | 6 |
| BASACID BLACK X34 dye***** | BASF roll mill 30 minutes | 21.2 |

*containing 95 wt. % sulfolane and 5 wt. % water
**bisphenol-A derivative, molecular weight 18,500, of the formula

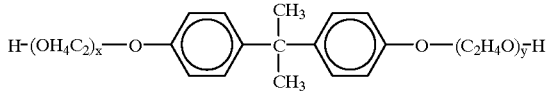

***aqueous solution containing 40 wt. % polymer in water
****aqueous solution containing 10 wt. % dye and 90 wt. % water
*****aqueous solution containing 34 wt. % dye and 66 wt. % water The resulting images exhibited an optical density of 1.43, a waterfastness of 95 percent, calculated as a percentage of optical density after 5 minutes soaking in water with agitation compared to optical density prior to soaking, and a wet smear of 0.03, measured as the optical density of a smeared area on an unprinted area adjacent to a full tone patch, smeared using a wet felt nib under a pressure of 70 grams, with the paper background optical density subtracted.

EXAMPLE IVa

A yellow ink composition was prepared by simple mixing of the following ingredients:

| Ingredient | Supplier | Amount (grams) |
|---|---|---|
| deionized water | — | 391.4 |
| DOWICIL 150/200 biocide | Dow Chemical Co. | 4 |
| polyethylene oxide* | Polysciences | 2 |
| imidazole | American Biorganics | 40 |
| ethylene diamine tetraacetic acid | Dow Chemical Co. | 2.6 |
| urea | Arcadian Corp. | 240 |
| sulfolane** | Phillips Petroleum Co. | 600 |
| acetylethanolamine*** | Scher Chemical | 640 |
| butyl carbitol | Van Waters & Rogers | 480 |

-continued

| Ingredient | Supplier | Amount (grams) |
|---|---|---|
| PROJET YELLOW OAM (Acid Yellow 23) dye**** | Zeneca Colors | 1600 |
| | roll mill 30 minutes | |

*bisphenol-A derivative, molecular weight 18,500, of the formula

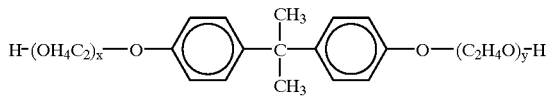

**containing 95 wt. % sulfolane and 5 wt. % water
***aqueous solution containing 75 wt. % acetylethanolamine and 25 wt. % water
****aqueous solution containing 7.5 wt. % dye solids and 92.5 wt. % water The resulting ink was filtered through a 1.2 micron Memtec filter at 20 pounds per square inch.

To 100 parts by weight of the ink thus prepared were added 5 parts by weight of 261 RV cationic polymer (obtained from Calgon Corp.) and 2.5 parts by weight of lithium chloride. The resulting ink composition was incorporated into a Hewlett-Packard 1600 ink jet printer and jetted onto Xerox Image Series Elite paper. The resulting images exhibited an optical density of 0.89 and a wet smear of 0.027±0.007, measured as the optical density of a smeared area on an unprinted area adjacent to a full tone patch, smeared using a wet felt nib under a pressure of 70 grams, with the paper background optical density subtracted.

EXAMPLE IVb

A yellow ink composition was prepared by simple mixing of the following ingredients:

| Ingredient | Supplier | Amount (grams) |
|---|---|---|
| deionized water | — | 391.4 |
| DOWICIL 150/200 biocide | Dow Chemical Co. | 4 |
| polyethylene oxide* | Polysciences | 2 |
| imidazole | American Biorganics | 40 |
| ethylene diamine tetraacetic acid | Dow Chemical Co. | 2.6 |
| urea | Arcadian Corp. | 240 |
| sulfolane** | Phillips Petroleum Co. | 600 |
| acetylethanolamine*** | Scher Chemical | 640 |
| butyl carbitol | Van Waters & Rogers | 480 |
| PROJET YELLOW OAM (Acid Yellow 23) dye**** | Zeneca Colors | 1600 |
| | roll mill 30 minutes | |

*bisphenol-A derivative, molecular weight 18,500, of the formula

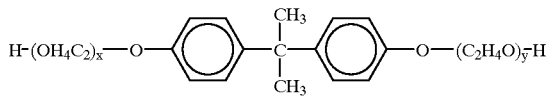

**containing 95 wt. % sulfolane and 5 wt. % water
***aqueous solution containing 75 wt. % acetylethanolamine and 25 wt. % water
****aqueous solution containing 7.5 wt. % dye solids and 92.5 wt. % water The resulting ink was filtered through a 1.2 micron Memtec filter at 20 pounds per square inch.

To 100 parts by weight of the ink thus prepared were added 9 parts by weight of 261 RV cationic polymer (obtained from Calgon Corp.) and 2.5 parts by weight of lithium chloride. The resulting ink composition was incorporated into a Hewlett-Packard 1600 ink jet printer and jetted onto Xerox Image Series Elite paper. The resulting images exhibited an optical density of 0.88 and a wet smear of 0.020±0.008, measured as the optical density of a smeared area on an unprinted area adjacent to a full tone patch, smeared using a wet felt nib under a pressure of 70 grams, with the paper background optical density subtracted.

EXAMPLE IVc

A magenta ink composition was prepared by simple mixing of the following ingredients:

| Ingredient | Supplier | Amount (grams) |
|---|---|---|
| deionized water | — | 628.6 |
| DOWICIL 150/200 biocide | Dow Chemical Co. | 4 |
| polyethylene oxide* | Polysciences | 2 |
| imidazole | American Biorganics | 40 |
| ethylene diamine tetraacetic acid | Dow Chemical Co. | 2.6 |
| sulfolane** | Phillips Petroleum Co. | 600 |
| acetylethanolamine*** | Scher Chemical | 640 |
| butyl carbitol | Van Waters & Rogers | 480 |
| PROJET MAGENTA 1T dye**** | Zeneca Colors | 1316 |
| PROJET RED OAM dye***** | Zeneca Colors | 286.8 |
| | roll mill 30 minutes | |

*bisphenol-A derivative, molecular weight 18,500, of the formula

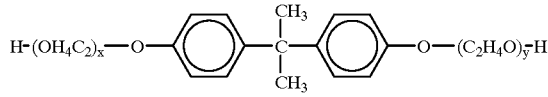

**containing 95 wt. % sulfolane and 5 wt. % water
***aqueous solution containing 75 wt. % acetylethanolamine and 25 wt. % water
****aqueous solution containing 10 wt. % dye solids and 90 wt. % water
*****aqueous solution containing 10 wt. % dye solids and 90 wt. % water The resulting ink was filtered through a 1.2 micron Memtec filter at 20 pounds per square inch.

To 100 parts by weight of the ink thus prepared were added 9 parts by weight of 261 RV cationic polymer (obtained from Calgon Corp.) and 8 parts by weight of lithium chloride. The resulting ink composition was incorporated into a Hewlett-Packard 1600 ink jet printer and jetted onto Xerox Image Series Elite paper. The resulting images exhibited an optical density of 1.04 and a wet smear of 0.012±0.004, measured as the optical density of a smeared area on an unprinted area adjacent to a full tone patch, smeared using a wet felt nib under a pressure of 70 grams, with the paper background optical density subtracted.

EXAMPLE IVd

A cyan ink composition was prepared by simple mixing of the following ingredients:

| Ingredient | Supplier | Amount (grams) |
|---|---|---|
| deionized water | — | 1059.8 |
| DOWICIL 150/200 biocide | Dow Chemical Co. | 4 |
| polyethylene oxide* | Polysciences | 2 |
| imidazole | American Biorganics | 40 |
| ethylene diamine tetraacetic acid | Dow Chemical Co. | 2.6 |
| sulfolane** | Phillips Petroleum Co. | 600 |
| acetylethanolamine*** | Scher Chemical | 640 |

-continued

| Ingredient | Supplier | Amount (grams) |
|---|---|---|
| butyl carbitol | Van Waters & Rogers | 480 |
| PROJET CYAN 1 dye**** | Zeneca Colors | 600 |
| PROJET BLUE OAM (Acid Blue 9) dye***** | Zeneca Colors | 571.6 |
| | roll mill 30 minutes | |

*bisphenol-A derivative, molecular weight 18,500, of the formula

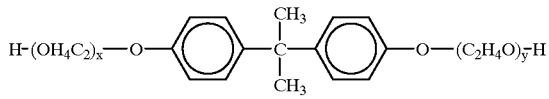

**containing 95 wt. % sulfolane and 5 wt. % water
***aqueous solution containing 75 wt. % acetylethanolamine and 25 wt. % water
****aqueous solution containing 10 wt. % dye solids and 90 wt. % water
*****aqueous solution containing 10 wt. % dye solids and 90 wt. % water The resulting ink was filtered through a 1.2 micron Memtec filter at 20 pounds per square inch.

To 100 parts by weight of the ink thus prepared were added 8 parts by weight of 261 RV cationic polymer (obtained from Calgon Corp.) and 7 parts by weight of lithium chloride. The resulting ink composition was incorporated into a Hewlett-Packard 1600 ink jet printer and jetted onto Xerox Image Series Elite paper. The resulting images exhibited an optical density of 1.18 and a wet smear of 0.028±0.009, measured as the optical density of a smeared area on an unprinted area adjacent to a full tone patch, smeared using a wet felt nib under a pressure of 70 grams, with the paper background optical density subtracted.

EXAMPLE V

An ink composition was prepared by simple mixing of the following ingredients:

| Ingredient | Supplier | Amount (grams) |
|---|---|---|
| deionized water | — | 52.98 |
| tris(hydroxymethyl) aminomethane | American Biorganics Inc. | 2 |
| ethylene diamine tetraacetic acid | Dow Chemical Co. | 0.13 |
| ethylene diamine dihydrochloride | Aldrich Chemical Co. | 10 |
| sulfolane* | Phillips Petroleum Co. | 12.6 |
| polyethylene oxide** | Polysciences | 0.1 |
| DOWICIL 150/200 biocide | Dow Chemical Co. | 0.2 |
| urea | Arcadian Corp. | 20 |
| tripropylene glycol monomethyl ether (DOWANOL TPM) | Dow Chemical Co. | 20 |
| TRITON X-100 surfactant | Aldrich Chemical Co. | 2 |
| VARIKEM 110 polymer*** | Calgon Corp. | 20 |
| PROJET BLUE OAM dye (Acid Blue 9)**** | Zeneca Colors | 60 |
| | roll mill 30 minutes | |

*containing 95 wt. % sulfolane and 5 wt. % water
**bisphenol-A derivative, molecular weight 18,500, of the formula

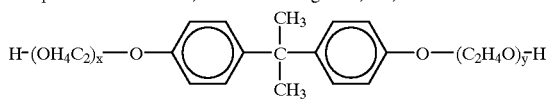

***aqueous solution containing 40 wt. % polymer in water
****aqueous solution containing 10 wt. % dye solids in water The ink was filtered through a 0.45 micron Memtech filter at 2 pounds per square inch over a period of 1 minute. The resulting ink exhibited a viscosity of 3.37 centipoise at 25° C., a pH of 6.87 at 25° C., a surface tension of 32.3 dynes per centimeter, and a conductivity of 33.5 millimhos.

The ink composition thus prepared was incorporated into a Hewlett-Packard 1600 ink jet printer and jetted onto Xerox Image Series Elite paper. The resulting images exhibited an optical density of 1.19, a waterfastness of 90 percent, calculated as a percentage of optical density after 5 minutes soaking in water with agitation compared to optical density prior to soaking, and a wet smear of 0.02, measured as the optical density of a smeared area on an unprinted area adjacent to a full tone patch, smeared using a wet felt nib under a pressure of 70 grams, with the paper background optical density subtracted.

EXAMPLE VI

An ink composition was prepared by simple mixing of the following ingredients:

| Ingredient | Supplier | Amount (grams) |
|---|---|---|
| deionized water | — | 30.52 |
| tris(hydroxymethyl) aminomethane | American Biorganics Inc. | 4 |
| ethylene diamine tetraacetic acid | Dow Chemical Co. | 0.24 |
| ethylene diamine dihydrochloride | Aldrich Chemical Co. | 10 |
| sulfolane* | Phillips Petroleum Co. | 12.6 |
| polyethylene oxide** | Polysciences | 0.1 |
| DOWICIL 150/200 biocide | Dow Chemical Co. | 0.2 |
| urea | Arcadian Corp. | 20 |
| tripropylene glycol monomethyl ether (DOWANOL TPM) | Dow Chemical Co. | 20 |
| TRITON X-100 surfactant | Aldrich Chemical Co. | 2 |
| VARIKEM 110 polymer*** | Calgon Corp. | 20 |
| PROJET RED OAM dye**** | Zeneca Colors | 14.34 |
| DUASYN BRILLIANT RED F3B SF VP 218 (Reactive Red 180)***** | Hoechst | 66 |
| | roll mill 30 minutes | |

*containing 95 wt. % sulfolane and 5 wt. % water
**bisphenol-A derivative, molecular weight 18,500, of the formula

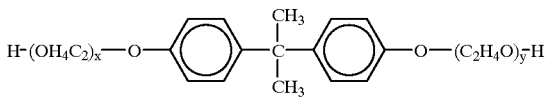

***aqueous solution containing 40 wt. % polymer in water
****aqueous solution containing 10 wt. % dye solids in water
****aqueous solution containing 10 wt. % dye and 90 wt. % water The ink was filtered through a The ink was filtered through a 0.2 micron, 47 millimeter Versapore-1200 filter at 60 pounds per square inch over a period of 6 minutes and 36 seconds. The resulting ink exhibited a viscosity of 3.36 centipoise at 25° C., a pH of 7.00 at 25° C., a surface tension of 32.1 dynes per centimeter, and a conductivity of 34.8 millimhos.

The ink composition thus prepared was incorporated into a Hewlett-Packard 1600 ink jet printer and jetted onto Xerox Image Series Elite paper. The resulting images exhibited an optical density of 1.01, a waterfastness of 91 percent, calculated as a percentage of optical density after 5 minutes soaking in water with agitation compared to optical density prior to soaking, and a wet smear of 0, measured as the optical density of a smeared area on an unprinted area adjacent to a full tone patch, smeared using a wet felt nib under a pressure of 70 grams, with the paper background optical density subtracted.

EXAMPLE VII

An ink composition was prepared by simple mixing of the following ingredients:

| Ingredient | Supplier | Amount (grams) |
|---|---|---|
| deionized water | — | 32.98 |
| tris(hydroxymethyl) aminomethane | American Biorganics Inc. | 2 |
| ethylene diamine tetraacetic acid | Dow Chemical Co. | 0.13 |
| ethylene diamine dihydrochloride | Aldrich Chemical Co. | 10 |
| sulfolane* | Phillips Petroleum Co. | 12.6 |
| polyethylene oxide** | Polysciences | 0.1 |
| DOWICIL 150/200 biocide | Dow Chemical Co. | 0.2 |
| urea | Arcadian Corp. | 20 |
| tripropylene glycol monomethyl ether (DOWANOL TPM) | Dow Chemical Co. | 20 |
| TRITON X-100 surfactant | Aldrich Chemical Co. | 2 |
| VARIKEM 110 polymer*** | Calgon Corp. | 20 |
| PROJET YELLOW OAM dye**** | Zeneca Colors roll mill 30 minutes | 80 |

*containing 95 wt. % sulfolane and 5 wt. % water
**bisphenol-A derivative, molecular weight 18,500, of the formula

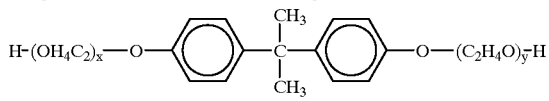

***aqueous solution containing 40 wt. % polymer in water
***aqueous solution containing 7.5 wt. % dye and 92.5 wt. % water The ink was filtered through a 0.45 micron Memtech filter at 2 pounds per square inch over a period of 1 minute. The resulting ink exhibited a viscosity of 3.37 centipoise at 25° C., a pH of 6.96 at 25° C., a surface tension of 32.2 dynes per centimeter, and a conductivity of 35.2 millimhos.

The ink composition thus prepared was incorporated into a Hewlett-Packard 1600 ink jet printer and jetted onto Xerox Image Series Elite paper. The resulting images exhibited an optical density of 0.83, a waterfastness of 84 percent, calculated as a percentage of optical density after 5 minutes soaking in water with agitation compared to optical density prior to soaking, and a wet smear of 0.01, measured as the optical density of a smeared area on an unprinted area adjacent to a full tone patch, smeared using a wet felt nib under a pressure of 70 grams, with the paper background optical density subtracted.

EXAMPLE VIII

An ink composition was prepared by simple mixing of the following ingredients:

| Ingredient | Supplier | Amount (grams) |
|---|---|---|
| deionized water | — | 1.35 |
| imidazole | Aldrich Chemical Co. | 1 |
| ethylene diamine tetraacetic acid | Dow Chemical Co. | 0.1 |
| polyethylene oxide* | Polysciences | 0.05 |
| DOWICIL 150/200 biocide | Dow Chemical Co. | 0.1 |
| formamide | Aldrich Chemical Co. | 35 |
| tripropylene glycol monomethyl ether (DOWANOL TPM) | Dow Chemical Co. | 10 |
| PROJET YELLOW OAM dye** | Zeneca Colors | 34.4 |
| VARIKEM 110 polymer*** | Calgon Corp. | 10 |
| calcium chloride dihydrate | Aldrich Chemical Co. roll mill 30 minutes | 8 |

*bisphenol-A derivative, molecular weight 18,500, of the formula $$H\text{-}(OH_4C_2)_x\text{-}O\text{-}\underset{CH_3}{\overset{CH_3}{\underset{|}{\overset{|}{C}}}}\text{-}O\text{-}(C_2H_4O)_{\overline{y}}H$$

**aqueous solution containing 7.5 wt. % dye and 92.5 wt % water
***aqueous solution containing 40 wt. % polymer in water The ink was filtered through a 0.2 micron 47 millimeter Gelman Nylaflow filter at 40 pounds per square inch. The resulting ink exhibited a viscosity of 4.66 centipoise at 25° C., a pH of 7.9 at 25° C., a surface tension of 42.8 dynes per centimeter, and a conductivity of 34 millimhos.

The ink composition thus prepared was incorporated into a Hewlett-Packard 1600 ink jet printer and jetted onto Xerox Image Series Elite paper. The resulting images exhibited an optical density of 0.85 and a waterfastness of 77 percent, calculated as a percentage of optical density after 5 minutes soaking in water with agitation compared to optical density prior to soaking.

EXAMPLE IXa

An ink composition was prepared by simple mixing of the following ingredients:

| Ingredient | Supplier | Amount (grams) |
|---|---|---|
| deionized water | — | 13.75 |
| tris(hydroxymethyl) aminomethane | American Biorganics Inc. | 2 |
| ethylene diamine tetraacetic acid | Dow Chemical Co. | 0.1 |
| ammonium bromide | Aldrich Chemical Co. pH = 8.28 | 10 |
| polyethylene oxide* | Polysciences | 0.05 |
| DOWICIL 150/200 biocide | Dow Chemical Co. | 0.1 |
| sulfolane** | Phillips Petroleum Co. | 6.3 |
| urea | Aldrich Chemical Co. | 20 |
| VARIKEM 110 polymer*** | Calgon Corp. | 15 |
| TRITON X-100 surfactant | Aldrich Chemical Co. pH = 8.51 | 0.44 |
| DUASYN BRILLIANT YELLOW GL-SF VP 220 dye**** | Hoechst | 10.4 |
| DUASYN BRILLIANT RED F3B SF VP 218 (Reactive Red 180) dye***** | Hoechst | 7.3 |
| PROJET CYAN 1****** | Zeneca Colors roll mill 30 minutes | 14.6 |

*bisphenol-A derivative, molecular weight 18,500, of the formula $$H\text{-}(OH_4C_2)_x\text{-}O\text{-}\underset{CH_3}{\overset{CH_3}{\underset{|}{\overset{|}{C}}}}\text{-}O\text{-}(C_2H_4O)_{\overline{y}}H$$

**containing 95 wt. % sulfolane and 5 wt. % water
***aqueous solution containing 40 wt. % polymer in water
****aqueous solution containing 20 wt. % dye and 80 wt. % water
*****aqueous solution containing 20 wt. % dye and 80 wt % water
******aqueous solution containing 10 wt. % dye and 90 wt % water The ink was filtered through a 0.45 micron Memtech filter at 10 pounds per square inch over a period of 30 seconds. The resulting ink exhibited a viscosity of 2.77 centipoise at 25° C., a pH of 7.51 at 25° C., a surface tension of 32.1 dynes per centimeter, and a conductivity of 43.7 millimhos. The resulting images exhibited an optical density of 1.24, a waterfastness of 93 percent, calculated as a percentage of optical density after 5 minutes soaking in water with agitation compared to optical density prior to soaking, and a wet smear of 0.02, measured as the optical density of a smeared area on an unprinted area adjacent to a full tone patch, smeared using a wet felt nib under a pressure of 70 grams, with the paper background optical density subtracted.

EXAMPLE IXb

An ink composition was prepared by simple mixing of the following ingredients:

| Ingredient | Supplier | Amount (grams) |
|---|---|---|
| deionized water | — | 16.25 |
| tris(hydroxymethyl) aminomethane | American Biorganics Inc. | 0.15 |
| ethylene diamine tetraacetic acid | Dow Chemical Co. | 0.125 |
| ammonium chloride | Aldrich Chemical Co. | 2.5 |
| sulfolane* | Phillips Petroleum Co. | 3.15 |
| polyethylene oxide** | Polysciences | 0.025 |
| DOWICIL 150/200 biocide | Dow Chemical Co. | 0.05 |
| urea | Aldrich Chemical Co. | 7.5 |
| butyl carbitol | Van Waters & Rogers | 1 |
| TRITON X-100 surfactant | Aldrich Chemical Co. | 0.5 |
| VARIKEM 110 polymer*** | Calgon Corp. | 3.75 |
| PROJET BLUE OAM (Acid Blue 9) dye**** | Zeneca Colors | 5 |
| | roll mill 30 minutes | |

*containing 95 wt. % sulfolane and 5 wt. % water
**bisphenol-A derivative, molecular weight 18,500, of the formula

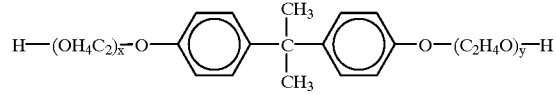

***aqueous solution containing 40 wt. % polymer in water
****aqueous solution containing 10 wt. % dye and 90 wt. % water The ink was filtered through a 1.2 micron Memtech filter at 3 pounds per square inch. The resulting ink exhibited a viscosity of 2.13 centipoise at 25° C., a pH of 7.38 at 22° C., a surface tension of 32.6 dynes per centimeter, and a conductivity of 58.7 millimhos. The resulting images exhibited an optical density of 1.23, a waterfastness of 60 percent, calculated as a percentage of optical density after 5 minutes soaking in water with agitation compared to optical density prior to soaking, and a wet smear of 0.05, measured as the optical density of a smeared area on an unprinted area adjacent to a full tone patch, smeared using a wet felt nib under a pressure of 70 grams, with the paper background optical density subtracted.

EXAMPLE X

An ink composition was prepared by simple mixing of the following ingredients:

| Ingredient | Supplier | Amount (grams) |
|---|---|---|
| deionized water | — | 16.75 |
| imidazole | Aldrich Chemical Co. | 1 |
| ethylene diamine tetraacetic acid | Dow Chemical Co. | 0.1 |
| polyethylene oxide* | Polysciences | 0.05 |
| DOWICIL 150/200 biocide | Dow Chemical Co. | 0.1 |
| formamide | Aldrich Chemical Co. | 35 |
| tripropylene glycol monomethyl ether (DOWANOL TPM) | Dow Chemical Co. | 10 |
| PROJET BLUE OAM (Acid Blue 9) | Zeneca Colors | 25 |
| VARIKEM 10 polymer*** | Calgon Corp. | 10 |
| potassium bromide | Mallinckrodt | 2 |
| | roll mill 30 minutes | |

*bisphenol-A derivative, molecular weight 18,500, of the formula

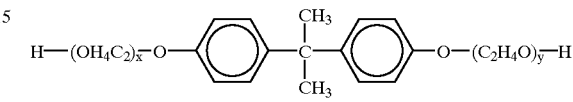

**aqueous solution containing 10 wt. % dye and 90 wt. % water
***aqueous solution containing 40 wt. % polymer in water The ink was filtered through a 0.2 micron 47 millimeter Gelman Nylaflow filter at 40 pounds per square inch. The resulting ink exhibited a viscosity of 2.92 centipoise at 25° C., a pH of 8.24 at 25° C., a surface tension of 44.2 dynes per centimeter, and a conductivity of 17.1 millimhos.

The ink composition thus prepared was incorporated into a Hewlett-Packard 1600 ink jet printer and jetted onto Xerox Image Series Elite paper. The resulting images exhibited an optical density of 1.19 and a waterfastness of 85 percent, calculated as a percentage of optical density after 5 minutes soaking in water with agitation compared to optical density prior to soaking.

EXAMPLE XI

An ink composition was prepared by simple mixing of the following ingredients:

| Ingredient | Supplier | Amount (grams) |
|---|---|---|
| deionized water | — | 25.35 |
| imidazole | Aldrich Chemical Co. | 1 |
| ethylene diamine tetraacetic acid | Dow Chemical Co. | 0.1 |
| polyethylene oxide* | Polysciences | 0.05 |
| DOWICIL 150/200 biocide | Dow Chemical Co. | 0.1 |
| dipropylene glycol | Ashland Chemicals | 11 |
| tripropylene gycol monomethyl ether (DOWANOL JPM) | Dow Chemical Co. | 10 |
| PROJET YELLOW OAM (Acid Yellow 23) dye** | Zeneca Colors | 34.4 |
| VARIKEM 110 polymer*** | Calgon Corp. | 10 |
| hexamethonium bromide hydrate | Aldrich Chemical Co. | 8 |
| | roll mill 30 minutes | |

*bisphenol-A derivative, molecular weight 18,500, of the formula

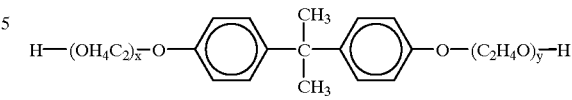

**aqueous solution containing 7.5 wt. % dye and 92.5 wt. % water
***aqueous solution containing 40 wt. % polymer in water The ink was filtered through a 0.2 micron 47 millimeter Gelman Nylaflow filter at 40 pounds per square inch. The resulting ink exhibited a viscosity of 4.21 centipoise at 25° C., a pH of 8.08 at 25° C., a surface tension of 40.5 dynes per centimeter, and a conductivity of 17.4 millimhos.

The ink composition thus prepared was incorporated into a Hewlett-Packard 1600 ink jet printer and jetted onto Xerox Image Series Elite paper. The resulting images exhibited an optical density of 0.84 and a waterfastness of 77 percent, calculated as a percentage of optical density after 5 minutes soaking in water with agitation compared to optical density prior to soaking.

EXAMPLE XII

An ink composition was prepared by simple mixing of the following ingredients:

| Ingredient | Supplier | Amount (grams) |
|---|---|---|
| deionized water | — | 55.35 |
| 1,3,5-trimethylhexahydro-1,3,5-triazine | Aldrich Chemical Co. | 1 |
| ethylene diamine tetraacetic acid | Dow Chemical Co. | 2.5 |
| polyethylene oxide* | Polysciences | 0.05 |
| DOWICIL 150/200 biocide | Dow Chemical Co. | 0.1 |
| lithium acetylacetonate | Aldrich Chemical Co. | 8 |
| tripropylene glycol monomethyl ether (DOWANOL TPM) | Dow Chemical Co. | 10 |
| urea | Aldrich Chemical Co. | 20 |
| TRITON X-100 | Aldrich Chemical Co. | |
| VARIKEM 110 polymer** | Calgon Corp. | 9 |
| DUASYN ACID YELLOW XX-SF VP413*** | Hoechst | 3 |
| | roll mill 30 minutes | |

*bisphenol-A derivative, molecular weight 18,500, of the formula

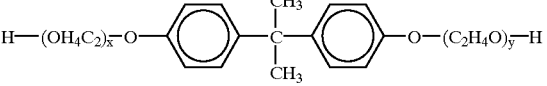

**aqueous solution containing 7.5 wt. % dye and 92.5 wt. % water
***dye supplied as 100 percent by weight dye solid The ink was filtered through a 1.2 micron Versapore-1200 filter at 20 pounds per square inch over a period of 20 seconds. The resulting ink exhibited a viscosity of 3.37 centipoise at 25° C., a pH of 9.47 at 25° C., a surface tension of 33.4 dynes per centimeter, and a conductivity of 17.6 millimhos. The resulting images exhibited an optical density of 0.90, a waterfastness of 75 percent, calculated as a percentage of optical density after 5 minutes soaking in water with agitation compared to optical density prior to soaking, and a wet smear of 0.02, measured as the optical density of a smeared area on an unprinted area adjacent to a full tone patch, smeared using a wet felt nib under a pressure of 70 grams, with the paper background optical density subtracted.

EXAMPLE XIII

An ink composition was prepared by simple mixing of the following ingredients:

| Ingredient | Supplier | Amount (grams) |
|---|---|---|
| deionized water | — | 61.9 |
| tetramethylammonium hydroxide* | Aldrich Chemical Co. | 5.1 |
| squaric acid** | Aldrich Chemical Co. | 1.3 |
| 1,3,5-trimethylhexahydro-1,3,5-triazine | Aldrich Chemical Co. | 0.9 |
| ethylene diamine tetraacetic acid | Dow Chemical Co. | 0.05 |
| polyethylene oxide*** | Polysciences | 0.05 |
| DOWICIL 150/200 biocide | Dow Chemical Co. | 0.1 |
| sulfolane**** | Phillips Petroleum Co. | 15.8 |
| TRITON X-100 | Aldrich Chemical Co. | 1 |
| VARIKEM 110 polymer***** | Calgon Corp. | 9 |
| fluorescein, sodium salt****** | Aldrich Chemical Co. | 1 |
| PROJET RED OAM dye******* | Zeneca Colors | 2.8 |
| additional deionized water | — | 1 |
| | roll mill 30 minutes | |

*aqueous solution containing 7.3 wt. % tetramethylammonium hydroxide
**aqueous solution containing 7.3 wt. % squaric acid
***bisphenol-A derivative, molecular weight 18,500, of the formula

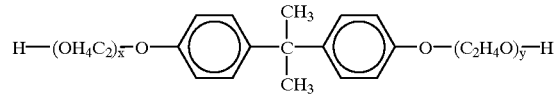

****containing 95 wt. % sulfolane and 5 wt. % water
*****aqueous solution containing 40 wt. % polymer in water
******aqueous solution containing 70 wt. % dye and 30 wt. % water
*******aqueous solution containing 10 wt. % dye and 90 wt. % water The ink was filtered through a 0.2 micron 47 millimeter Gelman Nylaflow filter at 20 pounds per square inch. The resulting ink exhibited a viscosity of 1.87 centipoise at 25° C., a pH of 7.26 at 25° C., a surface tension of 33.6 dynes per centimeter, and a conductivity of 19.5 millimhos. The resulting fluorescent images exhibited an optical density of 0.89 magenta and 0.82 yellow, a waterfastness of 85 percent, calculated as a percentage of optical density after 5 minutes soaking in water with agitation compared to optical density prior to soaking, and a wet smear of 0.02, measured as the optical density of a smeared area on an unprinted area adjacent to a full tone patch, smeared using a wet felt nib under a pressure of 70 grams, with the paper background optical density subtracted.

EXAMPLE XIV

An ink composition was prepared by simple mixing of the following ingredients:

| Ingredient | Supplier | Amount (grams) |
|---|---|---|
| deionized water | — | 34 |
| tris (hydroxymethyl) aminomethane | American Biorganics | 1 |
| ethylene diamine tetraacetic acid | Dow Chemical Co. | 1 |
| choline chloride | Aldrich Chemical Co. | 14 |
| DOWICIL 150/200 biocide | Dow Chemical Co. | 0.2 |
| tripropylene glycol monomethyl ether (DOWANOL TPM) | Dow Chemical Co. | 20 |
| sulfolane* | Phillips Petroleum Co. | 21 |
| VARIKEM 110 polymer** | Calgon Corp. | 40 |
| PROJET YELLOW OAM (Acid Yellow 23) dye*** | Zeneca Colors | 68.8 |
| | roll mill 30 minutes | |

*containing 95 wt. % sulfolane and 5 wt. % water
**aqueous solution containing 40 wt. % polymer in water
***aqueous solution containing 7.5 wt. % dye and 92.5 wt. % water The ink was filtered through a 0.2 micron 47 millimeter Gelman Nylaflow filter at 20 pounds per square inch. The resulting ink exhibited a viscosity of 4.07 centipoise at 25° C., a pH of 7.25 at 25° C., a surface tension of 38.7 dynes per centimeter, and a conductivity of 29.9 millimhos. The resulting images exhibited an optical density of 0.88, a waterfastness of 90 percent, calculated as a percentage of optical density after 5 minutes soaking in water with agitation compared to optical density prior to soaking, and a wet smear of 0.01, measured as the optical density of a smeared area on an unprinted area adjacent to a full tone patch, smeared using a wet felt nib under a pressure of 70 grams, with the paper background optical density subtracted. The ink thus prepared was heated to 60° C. for 5 hours; thereafter the pH of the ink was 7.08. For comparison purposes, a similar ink was prepared except that ammonium chloride was substituted for choline chloride (ink of Example XV). After being heated to 60° C. for 5 hours, the pH of the ink containing ammonium chloride was 6.25. While not being limited to any particular theory, it is believed that the equilibrium between ammonium chloride and free ammonia and hydrochloric acid allowed for ammonia to escape the solution preferentially to hydrochloric acid. Since no equivalent equilibrium exists for the quaternary choline halide, no equivalent process occurred. It is believed that the slight drop in pH for the choline chloride containing ink was the result of the dissolution of carbon dioxide in the ink, which thereafter converted to carbonic acid and lowered the pH slightly.

EXAMPLE XV

An ink composition was prepared by simple mixing of the following ingredients:

| Ingredient | Supplier | Amount (grams) |
|---|---|---|
| deionized water | — | 17.25 |
| tris(hydroxymethyl) aminomethane | American Biorganics | 0.5 |
| ethylene diamine tetraacetic acid | Dow Chemical Co. | 0.25 |
| ammonium chloride | Aldrich Chemical Co. | 7 |
| DOWICIL 150/200 biocide | Dow Chemical Co. | 0.1 |
| tripropylene glycol monomethyl ether (DOWANOL TPM) | Dow Chemical Co. | 10 |
| sulfolane* | Phillips Petroleum Co. | 10.5 |
| VARIKEM 110 polymer** | Calgon Corp. | 20 |
| PROJET YELLOW OAM (Acid Yellow 23) dye*** | Zeneca Colors | 34.4 |
| | roll mill 30 minutes | |

*containing 95 wt. % sulfolane and 5 wt. % water
**aqueous solution containing 40 wt. % polymer in water
***aqueous solution containing 7.5 wt. % dye and 92.5 wt. % water The ink was filtered through a 0.2 micron 47 millimeter Gelman Nylaflow filter at 20 pounds per square inch. The resulting ink exhibited a viscosity of 3.61 centipoise at 25° C., a pH of 7.41 at 25° C., a surface tension of 40.2 dynes per centimeter, and a conductivity of 77.7 millimhos. The resulting images exhibited an optical density of 0.87, a waterfastness of 90 percent, calculated as a percentage of optical density after 5 minutes soaking in water with agitation compared to optical density prior to soaking, and a wet smear of 0.01, measured as the optical density of a smeared area on an unprinted area adjacent to a full tone patch, smeared using a wet felt nib under a pressure of 70 grams, with the paper background optical density subtracted.

EXAMPLE XVI

An ink composition was prepared by simple mixing of the following ingredients:

| Ingredient | Supplier | Amount (grams) |
|---|---|---|
| deionized water | — | 38 |
| tris(hydroxymethyl) aminomethane | American Biorganics | 0.5 |
| ethylene diamine tetraacetic acid | Dow Chemical Co. | 0.35 |
| potassium bromide | Aldrich Chemical Co. | 8 |
| polyethylene oxide* | Polysciences | 0.05 |
| DOWICIL 150/200 biocide | Dow Chemical Co. | 0.1 |
| butyl carbitol | Van Waters & Rogers | 3 |
| urea | Aldrich Chemical Co. | 10 |
| tripropylene glycol monomethyl ether (DOWANOL TPM) | Dow Chemical Co. | 10 |
| VARIKEM 110 polymer** | Calgon Corp. | 5 |
| PROJET BLUE OAM (Acid Blue 9) dye*** | Zeneca Colors | 20 |
| PROJET CYAN 1**** | Zeneca Colors | 5 |
| | roll mill 30 minutes | |

*bisphenol-A derivative, molecular weight 18,500, of the formula

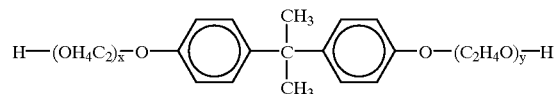

**aqueous solution containing 40 wt. % polymer in water
***aqueous solution containing 10 wt. % dye and 90 wt. % water
****aqueous solution containing 10 wt. % dye and 90 wt. % water The ink was filtered through a 0.2 micron 47 millimeter Gelman Nylaflow filter at 60 pounds per square inch. The resulting ink exhibited a viscosity of 2.52 centipoise at 25° C. and a pH of 7.60 at 25° C. An ink of similar composition except that the relative amount of potassium bromide in the ink was 16 percent by weight exhibited a viscosity of 2.50 centipoise at 25° C.

EXAMPLE XVII

An ink composition was prepared by simple mixing of the following ingredients:

| Ingredient | Supplier | Amount (grams) |
|---|---|---|
| deionized water | — | 38 |
| tris(hydroxymethyl) aminomethane | American Biorganics | 0.5 |
| ethylene diamine tetraacetic acid | Dow Chemical Co. | 0.35 |
| sodium bromide | Aldrich Chemical Co. | 8 |
| polyethylene oxide* | Polysciences | 0.05 |
| DOWICIL 150/200 biocide | Dow Chemical Co. | 0.1 |
| butyl carbitol | Van Waters & Rogers | 3 |
| urea | Aldrich Chemical Co. | 10 |
| tripropylene glycol monomethyl ether (DOWANOL TPM) | Dow Chemical Co. | 10 |
| VARIKEM 110 polymer** | Calgon Corp. | 5 |

-continued

| Ingredient | Supplier | Amount (grams) |
|---|---|---|
| PROJET BLUE OAM (Acid Blue 9) dye*** | Zeneca Colors | 20 |
| PROJET CYAN 1**** | Zeneca Colors roll mill 30 minutes | 5 |

*bisphenol-A derivative, molecular weight 18,500 of the formula

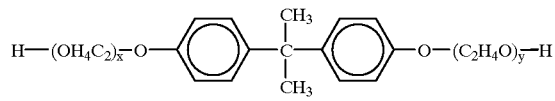

**aqueous solution containing 40 wt. % polymer in water
***aqueous solution containing 10 wt. % dye and 90 wt. % water
****aqueous solution containing 10 wt. % dye and 90 wt. % water The ink was filtered through a 0.2 micron 47 millimeter Gelman Nylaflow filter at 60 pounds per square inch. The resulting ink exhibited a viscosity of 2.82 centipoise at 25° C. and a pH of 7.36 at 25° C. An ink of similar composition except that the relative amount of sodium bromide in the ink was 16 percent by weight exhibited a viscosity of 3.11 centipoise at 25° C.

EXAMPLE XVIII

An ink composition was prepared by simple mixing of the following ingredients:

| Ingredient | Supplier | Amount (grams) |
|---|---|---|
| deionized water | — | 38 |
| tris(hydroxymethyl) aminomethane | American Biorganics | 0.5 |
| ethylene diamine tetraacetic acid | Dow Chemical Co. | 0.35 |
| lithium bromide | Aldrich Chemical Co. | 8 |
| polyethylene oxide* | Polysciences | 0.05 |
| DOWICIL 150/200 biocide | Dow Chemical Co. | 0.1 |
| butyl carbitol | Van Waters & Rogers | 3 |
| urea | Aldrich Chemical Co. | 10 |
| tripropylene glycol monomethyl ether (DOWANOL TPM) | Dow Chemical Co. | 10 |
| VARIKEM 110 polymer** | Calgon Corp. | 5 |
| PROJET BLUE OAM (Acid Blue 9) dye*** | Zeneca Colors | 20 |
| PROJET CYAN 1**** | Zeneca Colors roll mill 30 minutes | 5 |

*bisphenol-A derivative, molecular weight 18,500, of the formula

H—(OH$_4$C$_2$)$_{\overline{x}}$—O—⟨⟩—C(CH$_3$)$_2$—⟨⟩—O—(C$_2$H$_4$O)$_{\overline{y}}$—H

**aqueous solution containing 40 wt. % polymer in water
***aqueous solution containing 10 wt. % dye and 90 wt. % water
****aqueous solution containing 10 wt. % dye and 90 wt. % water The ink was filtered through a 0.2 micron 47 millimeter Gelman Nylaflow filter at 60 pounds per square inch. The resulting ink exhibited a viscosity of 3.17 centipoise at 25° C. and a pH of 7.24 at 25° C. An ink of similar composition except that the relative amount of lithium bromide in the ink was 16 percent by weight exhibited a viscosity of 3.70 centipoise at 25° C.

EXAMPLE XIX

Ink compositions were prepared by simple mixing of the following ingredients:

| Ingredient | Supplier | Amount (grams) |
|---|---|---|
| deionized water | — | 391.4 |
| DOWICIL 150/200 biocide | Dow Chemical Co. | 4 |
| polyethylene oxide* | Polysciences | 2 |
| imidazole | Aldrich Chemical Co. | 40 |
| ethylene diamine tetraacetic acid | Dow Chemical Co. | 2.4 |
| sulfolane** | Phillips | 600 |
| butyl carbitol | Van Waters & Rogers | 480 |
| PROJET YELLOW OAM (Acid Yellow 23) dye*** | Zeneca Colors roll mill 30 minutes | 1,600 |
| RETEN 200**** | Hercules | see table below |
| salt (see table below) | — | see table below |
| additional deionized water | — | † |

*bisphenol-A derivative, molecular weight 18,500 of the formula

H—(OH$_4$C$_2$)$_{\overline{x}}$—O—⟨⟩—C(CH$_3$)$_2$—⟨⟩—O—(C$_2$H$_4$O)$_{\overline{y}}$—H

**aqueous solution containing 95 wt. % sulfolane and 5 wt. % water
***aqueous solution containing 7.5 wt. % dye and 92.5 wt. % water
****amine-epichlorohydrin copolymer, MW <10,000, aqueous solution containing 50 wt. % polymer and 50 wt. % water
†additional deionized water added in an amount such that the total weight of ink prepared was 4,000 grams.

The amount (wt. % of the ink) of RETEN 200 (amount of polymer present; polymer commercially supplied as 50 percent by weight polymer in water) and the identity and amount (wt. % of the ink) of the salt contained in each ink are indicated in the table below, along with the ink viscosity and the optical density and waterfastness characteristics of the ink when hand coated with a #7 Meyer rod onto Xerox® Image Series Smooth paper. The images were tested for waterfastness by measuring the optical density of the initial image, subsequently immersing the image in water completely for 5 minutes, and measuring the optical density of the image subsequent to water immersion, with waterfastness expressed as a percentage reflecting the before and after optical densities. The images thus formed were tested for wet smear resistance by abrading the image with a moist felt tip marker and subsequently measuring the optical density of the area below the image ($D_{sm}$). The pressure of the felt tip marker was maintained at 100 grams and excess moisture was removed from the marker tip prior to smearing. All of the inks exhibited zero wet smear.

| wt. % RETEN 200 | salt and wt. % | optical density | waterfastness (%) | viscosity (centipoise) |
|---|---|---|---|---|
| 2 | 3% LiCl | 0.93 | 81 | 3.9 |
| 1.5 | 2.25% LiCl | 0.93 | 77 | 3.2 |
| 2 | 2% (NH$_4$)$_2$SO$_4$ | 0.94 | 80 | 3.5 |
| 3 | 2% (NH$_4$)$_2$SO$_4$ | 0.97 | 81 | 3.8 |
| 2 | 3% NH$_4$Cl | 0.93 | 85 | 3.2 |
| 3 | 2% NH$_4$Cl | 0.93 | 88 | 3.8 |
| 2 | 3% NH$_4$Cl | 0.93 | 78 | 3.2 |
| 1.5 | 2% NH$_4$Cl | 0.93 | 82 | 2.9 |
| 2 | 3% NH$_4$Br | 0.95 | 79 | 2.9 |
| 2 | 3.5% (CH$_3$)$_4$NCl | 0.90 | 84 | 3.5 |

As the data in the table indicate, the inks containing lithium chloride or ammonium sulfate and 2 percent by weight of the RETEN 200 have viscosities of from about 3.5 to about 3.9, whereas the inks containing the ammonium halides and 2 percent by weight of the RETEN 200 have viscosities of from about 2.9 to about 3.2.

EXAMPLE XX

Ink compositions were prepared by simple mixing of the following ingredients:

| Ingredient | Supplier | Amount (grams) |
| --- | --- | --- |
| deionized water | — | 391.4 |
| DOWICIL 150/200 biocide | Dow Chemical Co. | 4 |
| polyethylene oxide* | Polysciences | 2 |
| imidazole | Aldrich Chemical Co. | 40 |
| ethylene diamine tetraacetic acid | Dow Chemical Co. | 2.4 |
| sulfolane** | Phillips | 600 |
| butyl carbitol | Van Waters & Rogers | 480 |
| PROJET YELLOW OAM (Acid Yellow 23) dye*** | Zeneca Colors roll mill 30 minutes | 1,600 |
| RETEN 200**** | Hercules | see table below |
| salt (see table below) | — | see table below |
| additional deionized water | — | † |

*bisphenol-A derivative, molecular weight 18,500, of the formula

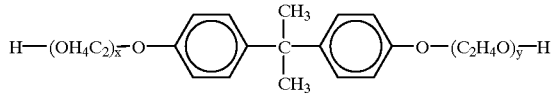

**aqueous solution containing 95 wt. % sulfolane and 5 wt. % water
***aqueous solution containing 7.5 wt. % dye and 92.5 wt. % water
****amine-epichlorohydrin copolymer, MW <10,000, aqueous solution containing 50 wt. % polymer and 50 wt. % water
†additional deionized water added in an amount such that the total weight of ink prepared was 4,000 grams.

The amount (wt. % of the ink) of RETEN 200 (amount of polymer present; polymer commercially supplied as 50 percent by weight polymer in water) and the identity and amount (wt. % of the ink) of the salt contained in each ink are indicated in the table below, along with the ink viscosity and the optical density, waterfastness (calculated as a percentage of print waterfastness after 5 minutes soaking in water with agitation of print waterfastness prior to soaking), showthrough (calculated as the optical density on the side of the paper opposite to that printed, both before water soak (shi) and after water soaking for 5 minutes with agitation (shf)), and wet smear characteristics of the ink (tested for wet smear resistance by abrading the image with a moist felt tip marker and subsequently measuring the optical density of the area below the image ($D_{sm}$); the pressure of the felt tip marker was maintained at 100 grams and excess moisture was removed from the marker tip prior to smearing) when hand coated with a #7 Meyer rod onto Xerox® Image Series Smooth paper.

| wt. % RETEN 200 | salt and wt. % | optical density | waterfast- ness (%) | viscosity (centipoise) |
| --- | --- | --- | --- | --- |
| 3 | 1% MgSO$_4$ | 0.97 | 85 | 4.1 |
| 3 | 3% MgSO$_4$ | 1.00 | 80 | 4.6 |
| 3 | 3% imidazolium chloride | 1.97 | 87 | 3.3 |
| 3 | 2% LiCl | 0.98 | 82 | 4.2 |
| 2 | 1.5% LiCl | 0.98 | 82 | 3.1 |
| 2 | 2% LiCl | 1.00 | 73 | 3.0 |
| 2 | 4% imidazolium chloride | 0.92 | 84 | 3.6 |
| 0 | 0 (control) | 1.00 | 40 | 2.5 |

| wt. % RETEN 200 | salt and wt. % | OD$_{shi}$ | OD$_{shf}$ | wet smear |
| --- | --- | --- | --- | --- |
| 3 | 1% MgSO$_4$ | 0.12 | 0.27 | 0 |
| 3 | 3% MgSO$_4$ | 0.10 | 0.29 | 0.01 |
| 3 | 3% imidazolium chloride | 0.10 | 0.26 | 0 |
| 3 | 2% LiCl | 0.16 | 0.32 | 0 |
| 2 | 1.5% LiCl | 0.15 | 0.31 | 0 |
| | 2% LiCl | 0.16 | 0.39 | 0.01 |
| 2 | 4% imidazolium chloride | 0.10 | 0.30 | 0 |
| 0 | 0 (control) | — | — | 0.10 |

EXAMPLE XXI

Ink compositions were prepared by simple mixing of the following ingredients:

| Ingredient | Supplier | Amount (grams) |
| --- | --- | --- |
| deionized water | — | 391.4 |
| DOWICIL 150/200 biocide | Dow Chemical Co. | 4 |
| polyethylene oxide* | Polysciences | 2 |
| imidazole | Aldrich Chemical Co. | 40 |
| ethylene diamine tetraacetic acid | Dow Chemical Co. | 2.4 |
| sulfolane** | Phillips | 600 |
| butyl carbitol | Van Waters & Rogers | 489 |
| PROJET YELLOW OAM (Acid Yellow 23) dye*** | Zeneca Colors roll mill 30 minutes | 1,600 |
| SUPERFLOC C567**** | Cytex | see table below |
| salt (see table below) | — | see table below |
| additional deionized water | — | † |

*bisphenol-A derivative, molecular weight 18,500, of the formula

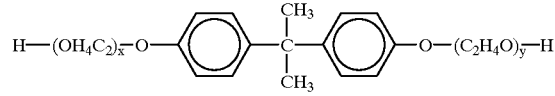

**aqueous solution containing 95 wt. % sulfolane and 5 wt. % water
***aqueous solution containing 7.5 wt. % dye and 92.5 wt. % water
****amine-epichlorohydrin copolymer, MW ≈ 10,000, aqueous solution containing 50 wt. % polymer and 50 wt. % water
†additional deionized water added in an amount such that the total weight of ink prepared was 4,000 grams.

The amount (wt. % of the ink) of SUPERFLOC C567 (amount of polymer present; polymer commercially supplied as 50 percent by weight polymer in water) and the identity and amount (wt. % of the ink) of the salt contained in each ink are indicated in the table below, along with the ink viscosity and the optical density, waterfastness (calculated as a percentage of print waterfastness after 5 minutes soaking in water with agitation of print waterfastness prior to soaking), and wet smear characteristics of the ink (tested for wet smear resistance by abrading the image with a moist felt tip marker and subsequently measuring the optical density of the area below the image ($D_{sm}$); the pressure of the felt tip marker was maintained at 100 grams and excess moisture was removed from the marker tip prior to smearing) when hand coated with a #7 Meyer rod onto Xerox® Image Series Smooth paper.

| wt. % SUPER-FLOC C567 | salt and wt. % | optical density | waterfast-ness (%) | wet smear | viscosity (centipoise) |
|---|---|---|---|---|---|
| 3.0 | 4% NH₄Br | 0.93 | 84 | 0.02 | 2.9 |
| 7.5 | 3.5% NH₄Br | 0.91 | 90 | 0.01 | 3.3 |
| 10.0 | 2.5% NH₄Br | 0.92 | 85 | 0.01 | 3.9 |
| 3.0* | 3% NH₄Br | 0.88 | 81 | 0.01 | 5.0 |
| 3.0* | 3% imidazolium chloride | 0.86 | 85 | 0.02 | 5.8 |
| 3.0** | 3% NH₄Br | 0.90 | 84 | 0.01 | 3.5 |
| 2.0 | 5% NH₄Br | 0.98 | 87 | 0.01 | 3.5 |

*ink also contained 6 percent by weight acetylethanolamine
**ink also contained 8 percent by weight acetylethanolamine In addition, curling behavior for the ink containing 3.0 percent by weight SUPERFLOC and 8 percent by weight acetylethanolamine was measured by hand coating the ink onto a 2 inch by 8 inch strip of Xerox® Image Series Smooth paper, hanging the strip vertically for 1 week, and measuring the number of turns of the scroll formed. The ink caused the paper to form ½ of a turn. For comparison purposes, inks of similar composition were prepared and tested for curl, containing RETEN 200 polymer instead of SUPERFLOC C567 polymer, one containing no acetylethanolamine and one containing 15 percent by weight acetylethanolamine. The ink containing no acetylethanolamine caused the paper to form one full turn of a 1 inch scroll, and the ink containing RETEN 200 and 15 percent by weight acetylethanolamine caused the paper to form ¼ of a turn.

EXAMPLE XXII

Ink compositions were prepared by simple mixing of the following ingredients:

| Ingredient | Supplier | Amount (grams) |
|---|---|---|
| deionized water | — | 391.4 |
| DOWICIL 150/200 biocide | Dow Chemical Co. | 4 |
| polyethylene oxide* | Polysciences | 2 |
| imidazole | Aldrich Chemical Co. | 40 |
| ethylene diamine tetraacetic acid | Dow Chemical Co. | 2.4 |
| sulfolane** | Phillips | 600 |
| butyl carbitol | Van Waters & Rogers | 489 |
| PROJET YELLOW OAM (Acid Yellow 23) dye*** | Zeneca Colors roll mill 30 minutes | 1,600 |
| SUPERFLOC C567**** | Cytex | see table below |
| salt (see table below) | — | see table below |
| acetylethanolamine | Scher Chemical | see table below |
| additional deionized water | — | † |

*bisphenol-A derivative, molecular weight 18,500, of the formula

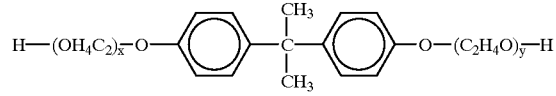

**aqueous solution containing 95 wt. % sulfolane and 5 wt. % water
***aqueous solution containing 7.5 wt. % dye and 92.5 wt. % water
****amine-epichlorohydrin copolymer, MW ≈ 10,000, aqueous solution containing 50 wt. % polymer and 50 wt. % water
†additional deionized water added in an amount such that the total weight of ink prepared was 4,000 grams.

The amount (wt. % of the ink) of SUPERFLOC C567 (amount of polymer present; polymer commercially sup- plied as 50 percent by weight polymer in water), the amount (wt. % of the ink) of acetylethanolamine, and the identity and amount (wt. % of the ink) of the salt contained in each ink are indicated in the first table below. The second table below shows the ink viscosity (η, centipoise, measured at 25° C.), pH (measured at 25° C.), surface tension (ST, dynes per centimeter), and conductivity (CD, millimhos, at 25° C.), and also shows the optical density (OD), wet smear characteristics (WS; measured as the optical density of a smeared area on an unprinted area adjacent to a full tone patch, smeared using a wet felt nib under 100 grams of pressure, with the paper background optical density subtracted), waterfastness (WF; calculated as a percentage of optical density after 5 minutes soaking in water with agitation compared to optical density prior to soaking), curl characteristics (CU; measured as the extent to which a full tone printed area causes the four corners of the papers to rise, expressed in millimeters as an average of corner height, after 24 hours at room temperature and relative humidity), and intercolor bleed characteristics (ICB; measured as the line edge acuity of a black 600 dpi line printed (with an ink comprising (a) 23.2 parts by weight of a solution containing 95 percent by weight sulfolane and 5 percent by water, (b) 13.81 parts by weight of carbon black particles obtained from Cabot Corp., (c) 6.0 parts by weight of 2-pyrrolidinone, (d) 4.24 parts by weight of a polymer latex containing 35 weight percent polymer solids, (e) 0.05 parts by weight of polyethylene oxide (MW 18,500), and (f) 52.7 parts by weight deionized water) in a yellow 300 dpi full tone patch, averaged over 3 prints, one on each paper type, and using many individual measurements of the line edge characteristics) of the ink when incorporated into a Hewlett-Packard 1600C printer and used to generate prints on Xerox Image Series LX paper, Hammermill Tidal DP paper, and Xerox 4024 DP paper (with the values obtained on the papers averaged, except for waterfastness, which was measured only on Xerox Image Series LX paper). For comparison purposes, similar testing was carried out on (A) the yellow ink supplied by Hewlett-Packard for the H-P 850; (B) an ink containing (all amounts in parts by weight) 40 parts PROJET YELLOW OAM (aqueous solution containing 7.5% by weight Acid Yellow 23), 16 parts acetylethanolamine, 15 parts sulfolane (95% by weight sulfolane, 5% by weight water), 12 parts butyl carbitol, 6 parts urea, 1 part imidazole, 0.1 part DOWICIL, 0.06 part EDTA, 0.05 part polyethylene oxide, and 0.79 part deionized water; and (C) an ink containing (all amounts in parts by weight) 40 parts PROJET YELLOW OAM (aqueous solution containing 7.5% by weight Acid Yellow 23), 20 parts acetylethanolamine, 10 parts sulfolane (95% by weight sulfolane, 5% by weight water), 6 parts butyl carbitol, 9 parts urea, 1.9 parts ethylene diamine dihydrochloride, 1 part imidazole, 0.1 part DOWICIL, 0.06 part EDTA, 0.05 part polyethylene oxide, and 11.89 parts deionized water.

| Ink | wt. % SUPERFLOC C567 | salt and wt. % | wt. % acetylethanol-amine |
|---|---|---|---|
| 1 | 5 | 5% NH₄Br | 6 |
| 2 | 5 | 5% NH₄NO₃ | 0 |
| 3 | 5 | 5% NH₄NO₃ | 6 |
| 4 | 14 | 2% NH₄NO₃ | 0 |

| Ink | η | pH | ST | CD | OD | WS | WF | CU | ICB |
|---|---|---|---|---|---|---|---|---|---|

-continued

| | | | | | | | | |
|---|---|---|---|---|---|---|---|---|
| 1 | 3.57 | 7.89 | 35.6 | 28.4 | 0.80 | 0.021 | 56 | 26 | 12.5 |
| 2 | 2.99 | 7.88 | 35.2 | 41.7 | 0.88 | 0.026 | 67 | 43 | 13.3 |
| 3 | 3.50 | 7.88 | 35.8 | 31.8 | 0.82 | 0.027 | 58 | 20 | 16.1 |
| 4 | 3.64 | 7.95 | 34.7 | 25.7 | 0.84 | 0.022 | 89 | 31 | 12.2 |
| A | 2.31 | 6.51 | 30.4 | 26.7 | 0.93* | 0.036* | 28* | 30.5* | 15* |
| B | 3.59 | 8.07 | 36.3 | 4.1 | 0.81 | 0.048 | 24 | 2.6** | 31 |
| C | 3.25 | 7.27 | 38.5 | 14.1 | 0.85 | 0.054 | 24 | 13.5 | 17 |

*Printed on a Hewlett-Packard 870 CSE printer 600 dpi black, 300 dpi yellow, using the black ink supplied for the printer for the ICB measurement
**measured at 30–32% relative humidity; others measured at 60–65 RH

EXAMPLE XXIII

A black ink composition was prepared by simple mixing of the following ingredients:

| Ingredient | Supplier | Amount (wt. %) |
|---|---|---|
| deionized water | — | 34.98 |
| tris(hydroxymethyl) aminomethane | American Biorganics Inc. | 0.3 |
| ethylene diamine tetraaetic acid | Dow Chemical Co. | 0.2 |
| VARIKEM 110 polyquaternary amine compound* | Calgon Corp. | 9 |
| DOWICIL 150/200 biocide | Dow Chemical Co. | 0.1 |
| polyethylene oxide** | Polysciences | 0.05 |
| urea | Aldrich Chemical Co. | 10.03 |
| sulfolane*** | Phillips Petroleum Co. | 7.64 |
| lithium chloride | Aldrich Chemical Co. | 3.01 |
| TRITON X-100 surfactant | Aldrich Chemical Co. | 1 |
| PROJET YELLOW OAM dye (Acid Yellow 23)**** | Zeneca Colors | 13.39 |
| PROJET RED OAM dye***** | Zeneca Colors | 11.76 |
| PROJET BLUE OAM dye (Acid Blue 9)****** | Zeneca Colors | 8.54 |
| | roll mill 30 minutes | |

*aqueous solution containing 40 wt. % polymer and 60 wt. % water
**bisphenol-A derivative, molecular weight 18,500, of the formula

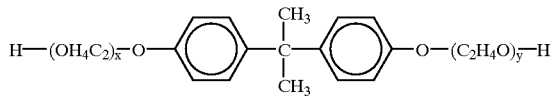

***containing 95 wt. % sulfolane and 5 wt. % water
****aqueous solution containing 7.5 wt. % dye and 92.5 wt. % water
*****aqueous solution containing 10 wt. % dye solids in water
******aqueous solution containing 10 wt. % dye solids in water The ink was filtered through a 0.2 micron, 47 millimeter Gelman Nylaflow filter at 40 pounds per square inch over a period of 15 minutes. The resulting ink exhibited a viscosity of 2.12 centipoise at 25° C., a pH of 7.16 at 25° C., a surface tension of 33.1 dynes per centimeter, and a conductivity of 42.7 millimhos.

The ink thus prepared was incorporated into a XEROX® 4004 Personal Printer and jetted onto XEROX® Image Series paper and onto Courtland paper. The resulting prints exhibited an optical density of 1.40 as measured with an X-Rite 428 Densitometer, a waterfastness of 90 percent, calculated as a percentage of optical density after 5 minutes soaking in water with agitation compared to optical density prior to soaking, and a wet smear of 0.06, measured as the optical density of a smeared area on an unprinted area adjacent to a full tone patch, smeared using a wet felt nib under a pressure of 70 grams, with the paper background optical density subtracted.

EXAMPLE XXIV

An ink composition was prepared by simple mixing of the following ingredients:

| Ingredient | Supplier | Amount (grams) |
|---|---|---|
| deionized water | — | 4.26 |
| sulfolane* | Phillips | 4.2 |
| tripropylene glycol monomethyl ether | Dow Chemical Co. | 3.4 |
| 1-hexane sulfonic acid, sodium salt | Aldrich Chemical Co. | 0.04 |
| cationic conductive polymer 261-RV** | Calgon Corp. | 0.1 |
| PROJET BLUE OAM dye (Acid Blue 9)*** | Zeneca Colors | 8 |
| | roll mill 30 minutes | |

*containing 95 wt. % sulfolane and 5 wt. % water
**aqueous solution containing 10 wt. % polymer and 90 wt. % water
***aqueous solution containing 10 wt. % dye and 90 wt. % water

EXAMPLE XXV

An ink composition was prepared by simple mixing of the following ingredients:

| Ingredient | Supplier | Amount (grams) |
|---|---|---|
| deionized water | — | 11.16 |
| imidazole | Aldrich Chemical Co. | 0.2 |
| phosphorous acid | Rhone Poulenc pH = 7.8 | 0.1 |
| sulfolane* | Phillips | 4.2 |
| tripropylene glycol monomethyl ether | Dow Chemical Co. | 3.4 |
| 1-hexane sulfonic acid, sodium salt | Aldrich Chemical Co. | 0.04 |
| Duasyn Brilliant Red F3B SF VP 218 dye (Reactive Red 180) | Hoechst | 0.8 |
| cationic conductive polymer 261-RV** | Calgon Corp. | 0.1 |
| | roll mill 30 minutes | |

*containing 95 wt. % sulfolane and 5 wt. % water
**aqueous solution containing 10 wt. % polymer and 90 wt. % water

EXAMPLE XXVI

An ink composition was prepared by simple mixing of the following ingredients:

| Ingredient | Supplier | Amount (grams) |
|---|---|---|
| deionized water | — | 4.26 |
| sulfolane* | Phillips | 4.2 |
| tripropylene glycol monomethyl ether | Dow Chemical Co. | 3.4 |
| 1-hexane sulfonic acid, sodium salt | Aldrich Chemical Co. | 0.04 |
| cationic conductive polymer 261-RV** | Calgon Corp. | 0.1 |

-continued

| Ingredient | Supplier | Amount (grams) |
|---|---|---|
| PROJET RED OAM dye*** | Zeneca Colors roll mill 30 minutes | 8 |

*containing 95 wt. % sulfolane and 5 wt. % water
**aqueous solution containing 10 wt. % polymer and 90 wt. % water
***aqueous solution containing 10 wt. % dye and 90 wt. % water

EXAMPLE XXVII

An ink composition was prepared by simple mixing of the following ingredients:

| Ingredient | Supplier | Amount (grams) |
|---|---|---|
| deionized water | — | 745.5 |
| tris(hydroxymethyl) aminomethane | American Biorganics Inc. | 3 |
| ethylene diamine tetraacetic acid | Dow Chemical Co. | 2 |
| cationic conductive polymer 261-RV* | Calgon Corp. | 5 |
| DOWICIL 150/200 biocide | Dow Chemical Co. | |
| polyethylene oxide** | Polysciences | 0.5 |
| sulfolane*** | Phillips | 63 |
| urea | Aldrich Chemical Co. | 100 |
| lithium chloride | Aldrich Chemical Co. | 10 |
| TRITON X-100 | Aldrich Chemical Co. | 10 |
| PROJET RED OAM dye**** | Zeneca Colors | 50 |
| Fluorescein (Acid Yellow 73)***** | EM Science roll mill 30 minutes | 10 |

*aqueous solution containing 40 wt. % polymer and 60 wt. % water
**bisphenol-A derivative, molecular weight 18,500, of the formula

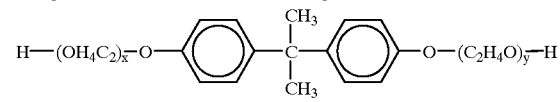

***containing 95 wt. % sulfolane and 5 wt. % water
****aqueous solution containing 10 wt. % dye and 90 wt. % water
*****aqueous solution containing 10 wt. % dye and 90 wt. % water

EXAMPLE XXVIII

An ink composition was prepared by simple mixing of the following ingredients:

| Ingredient | Supplier | Amount (grams) |
|---|---|---|
| deionized water | — | 35.47 |
| tris(hydroxymethyl) aminomethane | American Biorganics Inc. | 0.5 |
| ethylene diamine tetraacetic acid | Dow Chemical Co. | 0.35 |
| ammonium chloride | Aldrich Chemical Co. | 3 |
| polyethylene oxide* | Polysciences | 0.05 |
| DOWICIL 150/200 biocide | Dow Chemical Co. | 0.1 |
| tripropylene glycol monomethyl ether (DOWANOL TPM) | Dow Chemical Co. | 1.5 |
| sulfolane** | Phillips | 10.53 |
| VARIKEM 110 polyquaternary amine compound*** | Calgon Corp. | 10 |
| PROJET MAGENTA 1 dye (Acid Red 249)**** | Zeneca Colors roll mill 30 minutes | 25 |

*bisphenol-A derivative, molecular weight 18,500, of the formula

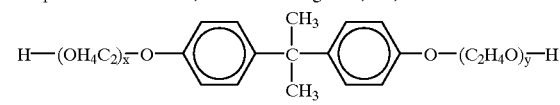

**containing 95 wt. % sulfolane and 5 wt. % water
***aqueous solution containing 40 wt. % polymer and 60 wt. % water
****aqueous solution containing 10 wt. % dye and 90 wt. % water

EXAMPLE XXIX

An ink composition was prepared by simple mixing of the following ingredients:

| Ingredient | Supplier | Amount (grams) |
|---|---|---|
| deionized water | — | 40.5 |
| tris(hydroxymethyl) aminomethane | American Biorganics Inc. | 0.5 |
| ethylene diamine tetraacetic acid | Dow Chemical Co. | 0.35 |
| ammonium chloride | Aldrich Chemical Co. | 2.5 |
| polyethylene oxide* | Polysciences | 0.05 |
| DOWICIL 150/200 biocide | Dow Chemical Co. | 0.1 |
| cyclohexylpyrrolidinone | Aldrich Chemical Co. | 6 |
| urea | Aldrich Chemical Co. | 10 |
| VARIKEM 110 polyquaternary amine compound** | Calgon Corp. | 10 |
| PROJET MAGENTA 1 dye (Acid Red 249)*** | Zeneca Colors roll mill 30 minutes | 30 |

*bisphenol-A derivative, molecular weight 18,500, of the formula

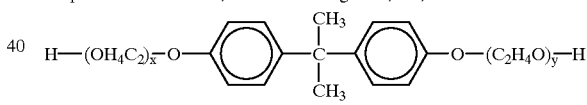

**aqueous solution containing 40 wt. % polymer and 60 wt. % water
***aqueous solution containing 10 wt. % dye and 90 wt. % water The ink was filtered through a 1.2 micron/5 micron, 47 millimeter Gelman Nylaflow filter at 10 pounds per square inch over a period of 1 minute and 30 seconds. The resulting ink exhibited a viscosity of 2.05 centipoise at 25° C., a pH of 7.37 at 25° C., a surface tension of 41.8 dynes per centimeter, and a conductivity of 44.6 millimhos.

EXAMPLE XXX

Ink compositions were prepared by simple mixing of the following ingredients:

| Ingredient | Supplier | Amount (grams) |
|---|---|---|
| deionized water | — | 15.9 |
| VARIKEM 110 polyquaternary amine compound* | Calgon Corp. | 15 |
| tris(hydroxymethyl) aminomethane | American Biorganics Inc. | 0.3 |
| ethylene diamine tetraacetic acid | Dow Chemical Co. | 0.05 |

-continued

| Ingredient | Supplier | Amount (grams) |
|---|---|---|
| ammonium chloride | Aldrich Chemical Co. | |
| polyethylene oxide** | Polysciences | 0.05 |
| DOWICIL 150/200 biocide | Dow Chemical Co. | 0.1 |
| butyl carbitol | Van Waters & Rogers | 3 |
| tripropylene glycol monomethyl ether (DOWANOL TPM) | Dow Chemical Co. | 10 |
| sulfolane*** | Phillips Petroleum Co. | 15 |
| PROJET CYAN 1 (Direct Blue 199) | Zeneca Colors | 15 |
| PROJET BLUE OAM dye (Acid Blue 9)***** | Zeneca Colors roll mill 30 minutes | 15 |

*aqueous solution containing 40 wt. % polymer and 60 wt. % water
**bisphenol-A derivative, molecular weight 18,500, of the formula

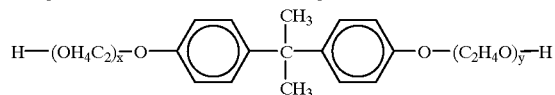

***containing 95 wt. % sulfolane and 5 wt. % water
****aqueous solution containing 10 wt. % dye and 90 wt. % water
*****aqueous solution containing 10 wt. % dye and 90 wt. % water The ink was filtered through a 1.2 micron Memtec filter. The resulting ink exhibited a viscosity of 4.17 centipoise at 25° C. and a pH of 7.32 at 22° C.

| Ingredient | Supplier | Amount (grams) |
|---|---|---|
| deionized water | — | 21.5 |
| VARIKEM 110 polyquaternary amine compound* | Calgon Corp. | |
| tris(hydroxymethyl) aminomethane | American Biorganics Inc. | 0.3 |
| ethylene diamine tetraacetic acid | Dow Chemical Co. | 0.05 |
| ammonium chloride | Aldrich Chemical Co. | 10 |
| polyethylene oxide** | Polysciences | 0.05 |
| DOWICIL 150/200 biocide | Dow Chemical Co. | 0.1 |
| butyl carbitol | Van Waters & Rogers | 3 |
| tripropylene glycol monomethyl ether (DOWANOL TPM) | Dow Chemical Co. | 10 |
| sulfolane*** | Phillips Petroleum Co. | 15 |
| PROJET CYAN 1 (Direct Blue 199) dye**** | Zeneca Colors | 5 |
| PROJET BLUE OAM dye (Acid Blue 9)***** | Zeneca Colors roll mill 30 minutes | 20 |

*aqueous solution containing 40 wt. % polymer and 60 wt. % water
**bisphenol-A derivative, molecular weight 18,500, of the formula

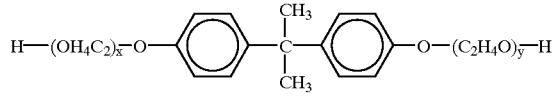

***containing 95 wt. % sulfolane and 5 wt. % water
****aqueous solution containing 10 wt. % dye and 90 wt. % water
*****aqueous solution containing 10 wt. % dye and 90 wt. % water The ink was filtered through a 1.2 micron Memtec filter. The resulting ink exhibited a viscosity of 4.06 centipoise at 25° C. and a pH of 7.33 at 22° C. For comparison purposes, a similar ink composition was prepared containing 2.5 percent by weight Acid Blue 9 dye and no Direct Blue 199 dye. All three inks were applied to paper and exposed to 4 hours of summer sun near zenith. The ink containing only Acid Blue 9 dye exhibited a lightfastness of 60 percent (calculated as a percentage of optical density after exposure for 48 hours with a Fadometer standard tungsten illuminator compared to optical density prior to exposure, the ink containing 2 percent by weight Acid Blue 9 and 0.5 percent by weight Direct Blue 199 dye exhibited a lightfastness of 80 percent, and the ink containing 1.5 percent by weight Acid Blue 9 and 1.5 percent by weight Direct Blue 199 dye exhibited a lightfastness of 95 percent.

EXAMPLE XXXI

An ink composition was prepared by simple mixing of the following ingredients:

| Ingredient | Supplier | Amount (grams) |
|---|---|---|
| deionized water | — | 225 |
| tris(hydroxymethyl) aminomethane | American Biorganics Inc. | 13 |
| ethylene diamine tetraacetic acid | Dow Chemical Co. | 7 |
| polyethylene oxide* | Polysciences | 1 |
| DOWICIL 150/200 biocide | Dow Chemical Co. | 2 |
| PROJET BLUE OAM dye (Acid Blue 9)** | Zeneca Colors | 300 |
| PROJET CYAN 1 (Direct Blue 199) dye*** | Zeneca Colors | 300 |
| ammonium bromide | Morre-Tec Industries | 200 |
| sulfolane**** | Phillips Petroleum Co. | 652 |
| tripropylene glycol monomethyl ether (DOWANOL TPM) | Dow Chemical Co. | 100 |
| betaine | Finnsugar Bioproducts | 100 |
| VARIKEM 110 polyquaternary amine compound***** | Calgon Corp. roll mill 30 minutes | 100 |

*bisphenol-A derivative, molecular weight 18,500, of the formula

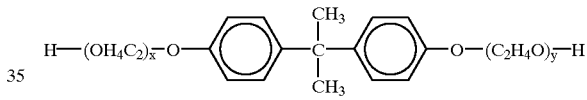

**aqueous solution containing 10 wt. % dye and 90 wt. % water
***aqueous solution containing 10 wt. % dye and 90 wt. % water
****containing 95 wt. % sulfolane and 5 wt. % water
*****aqueous solution containing 40 wt. % poiymer and 60 wt. % water The ink was filtered through a 0.2 micron 47 millimeter Gelman Nylaflow filter at 20 pounds per square inch over a period of 4 minutes. The resulting ink exhibited a viscosity of 3.73 centipoise at 25° C., a pH of 7.55 at 22° C., a surface tension of 45.4 dynes per centimeter, and a conductivity of 44.8 millimhos.

To 100 parts by weight of the ink thus prepared was added 1 part by weight of CALFAX 10L-45 polyanionic surfactant. The ink viscosity remained at 3.74 centipoise and surface tension dropped to 29.6 dynes per centimeter. The ink was incorporated into a Xerox® XJ4C ink jet printer and jetted onto Xerox Image Series Elite paper and Courtland 4024 DP Paper. Prior to jetting the printer was allowed to sit overnight in the maintenance cap. Multiple page printing was thereafter performed at fresh start-up with good results. When the printer was allowed to sit overnight in the decapped mode, recovery without priming and printing with good results was also observed.

EXAMPLE XXXII

An ink composition was prepared by simple mixing of the following ingredients:

| Ingredient | Supplier | Amount (grams) |
|---|---|---|
| deionized water | — | 225 |
| tris(hydroxymethyl) aminomethane | American Biorganics Inc. | 13 |
| ethylene diamine tetraacetic acid | Dow Chemical Co. | 7 |
| polyethylene oxide* | Polysciences | 1 |
| DOWICIL 150/200 biocide | Dow Chemical Co. | 2 |
| PROJET BLUE OAM dye (Acid Blue 9)** | Zeneca Colors | 300 |
| PROJET CYAN 1 (Direct Blue 199) dye*** | Zeneca Colors | 300 |
| ammonium bromide | Morre-Tec Industries | 200 |
| sulfolane**** | Phillips Petroleum Co. | 652 |
| tripropylene glycol monomethyl ether (DOWANOL TPM) | Dow Chemical Co. | 100 |
| betaine | Finnsugar Bioproducts | 100 |
| VARIKEM 110 polyquaternary amine compound***** | Calgon Corp. roll mill 30 minutes | 100 |

*bisphenol-A derivative, molecular weight 18,500, of the formula

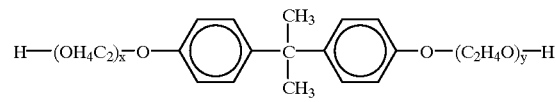

**aqueous solution containing 10 wt. % dye and 90 wt. % water
***aqueous solution containing 10 wt. % dye and 90 wt. % water
****containing 95 wt. % sulfolane and 5 wt. % water
*****aqueous solution containing 40 wt. % polymer and 60 wt. % water The ink was filtered through a 0.2 micron 47 millimeter Gelman Nylaflow filter at 20 pounds per square inch over a period of 4 minutes. The resulting ink exhibited a viscosity of 3.73 centipoise at 25° C., a pH of 7.55 at 22° C., a surface tension of 45.4 dynes per centimeter, and a conductivity of 44.8 millimhos.

Additional inks were prepared by adding to 100 parts by weight of the ink thus prepared various amounts (shown in the table below as number of parts by weight surfactant added to 100 parts by weight of the base ink composition) of various nonionic surfactants as shown in the table below. The inks were incorporated into a Xerox® XJ4C ink jet printer and jetted onto Xerox Image Series Elite paper and Courtland 4024 DP Paper. Prior to jetting the printer was allowed to sit overnight in the maintenance cap. Multiple page printing was thereafter performed at fresh start-up with good results. When the printer was allowed to sit overnight in the decapped mode, recovery without priming and printing with good results was also observed. The viscosity (centipoise, measured at 25° C.), surface tension (dynes per centimeter), and recoverability data (shown on a scale of 1 to 5, with 1 representing complete recovery and 5 representing complete dropout) for each ink are shown in the table:

| surfactant | amount | surface tension | viscosity | recoverability |
|---|---|---|---|---|
| none (control) | — | 45.4 | 3.73 | 5 |
| MERPOL LF-H | 0.5 | 33 | 3.62 | 1 |
| MERPOL LF-H | 1 | 32 | 3.81 | 1 |
| MERPOL LF-H | 2 | 33.5 | 3.84 | 1 |
| MERPOL LF-H | 4 | 33.9 | 3.92 | 1 |
| SURFYNOL CT-136 | 0.5 | 37.2 | 3.77 | 1 |
| SURFYNOL CT-136 | 1 | 35.7 | 3.89 | 1 |
| SURFYNOL CT-136 | 2 | 34.2 | 3.92 | 1 |
| SURFYNOL CT-136 | 4 | 32.8 | 4.16 | 2 |
| TRITON X-100 | 0.5 | 34.7 | 3.81 | 1 |
| TRITON X-100 | 1 | 34.5 | 3.99 | 1 |
| TRITON X-100 | 2 | 35.4 | 4.26 | 2 |
| TRITON X-100 | 4 | 35.1 | 4.89 | 3 |
| TERGITOL TMN-10 | 0.5 | 32.4 | 3.81 | 4 |
| TERGITOL TMN-10 | 1 | 29.9 | 3.92 | 1 |
| TERGITOL TMN-10 | 2 | 29.0 | 4.17 | 2 |
| TERGITOL TMN-10 | 4 | 29.2 | 4.73 | 3 |

EXAMPLE XXXIII

An ink composition was prepared by simple mixing of the following ingredients:

| Ingredient | Supplier | Amount (grams) |
|---|---|---|
| PROJET YELLOW OAM (Acid Yellow 23) dye* | Zeneca Colors | 28.9 |
| DUASYN ACID YELLOW XX-SF VP413** | Hoechst | 0.3 |
| imidazole | American Biorganics | 1 |
| ethylene diamine tetraacetic acid | Dow Chemical Co. | 0.05 |
| polyethylene oxide*** | Polysciences | 0.05 |
| DOWICIL 150/200 biocide | Dow Chemical Co. | 0.1 |
| ammonium bromide | Morre-Tec Industries | 15 |
| formamide | Aldrich Chemical Co. | 10 |
| tripropylene glycol monomethyl ether (DOWANOL TPM) | Dow Chemical Co. | 5 |
| sulfolane**** | Phillips Petroleum Co. | 32.6 |
| VARIKEM 110 polyquaternary amine compound***** | Calgon Corp | 5 |
| potassium bromide | Mallinckrodt roll mill 30 minutes | 2 |

*aqueous solution containing 7.5 wt. % dye and 92.5 wt. % water
**dye supplied as 100 wt. % dye solid
***bisphenol-A derivative, molecular weight 18,500, of the formula

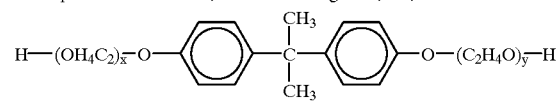

****containing 95 wt. % sulfolane and 5 wt. % water
*****aqueous solution containing 40 wt. % polymer and 60 wt. % water The ink was filtered through a 0.2 micron 47 millimeter Gelman Nylaflow filter at 20 pounds per square inch. The resulting ink exhibited a viscosity of 3.92 centipoise at 25° C., a pH of 7.56 at 25° C., a surface tension of 46.5 dynes per centimeter, and a conductivity of 59.7 millimhos.

EXAMPLE XXXIV

An ink composition was prepared by simple mixing of the following ingredients:

| Ingredient | Supplier | Amount (grams) |
|---|---|---|
| PROJET YELLOW OAM (Acid Yellow 23) dye* | Zeneca Colors | 28.9 |
| DUASYN ACID YELLOW XX-SF VP413** | Hoechst | 0.3 |

-continued

| Ingredient | Supplier | Amount (grams) |
|---|---|---|
| imidazole | American Biorganics | 1 |
| ethylene diamine tetraacetic acid | Dow Chemical Co. | 0.05 |
| polyethylene oxide*** | Polysciences | 0.05 |
| DOWICIL 150/200 biocide | Dow Chemical Co. | 0.1 |
| ammonium bromide | Morre-Tec Industries | 15 |
| tripropylene glycol monomethyl ether (DOWANOL TPM) | Dow Chemical Co. | 5 |
| sulfolane**** | Phillips Petroleum Co. | 32.6 |
| VARIKEM 110 polyquaternary amine compound***** | Calgon Corp | 5 |
| potassium bromide | Mallinckrodt | 2 |
| dimethyl sulfoxide | Baker Chemicals roll mill 30 minutes | 10 |

*aqueous solution containing 7.5 wt. % dye and 92.5 wt. % water
**dye suppiied as 100 wt. % dye solid
***bisphenol-A derivative, moiecular weight 18,500, of the formula

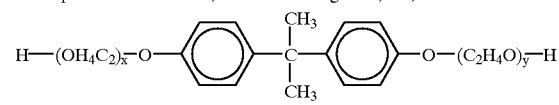

****containing 95 wt. % sulfolane and 5 wt. % water
*****aqueous solution containing 40 wt. % polymer and 60 wt. % water The ink was filtered through a 0.2 micron 47 millimeter Gelman Nylaflow filter at 20 pounds per square inch. The resulting ink exhibited a viscosity of 4.79 centipoise at 25° C., a pH of 7.55 at 25° C., a surface tension of 45.1 dynes per centimeter, and a conductivity of 49.2 millimhos.

EXAMPLE XXXV

An ink composition was prepared by simple mixing of the following ingredients:

| Ingredient | Supplier | Amount (wt. %) |
|---|---|---|
| deionized water | — | 38 |
| 2-pyrrolidinone | Aldrich Chemical Co. | 20 |
| sulfolane* | Phillips Petroleum Co. | 20 |
| imidazolium chloride | Aldrich Chemical Co. | 5 |
| butyl carbitol | Van Waters & Rogers | 10 |
| LUVIQUAT FC 905 copolymer | BASF | 2 |
| Acid Yellow 23 dye | Warner & Jenkinson | 5 |

*containing 95 wt. % sulfolane and 5 wt. % water

The ink composition thus prepared was hand coated onto Xerox® 4024 DP 20# paper with a #7 Meier rod. The image dried in 2 seconds and exhibited an optical density of 1.02. The image was subsequently washed in water for 20 seconds, after which the optical density was 0.87. Wet smear was barely detectable.

EXAMPLE XXXVI

An ink composition was prepared by simple mixing of the following ingredients:

| Ingredient | Supplier | Amount (wt. %) |
|---|---|---|
| deionized water | — | 60 |
| 2-pyrrolidinone | Aldrich Chemical Co. | 20 |
| imidazole | Aldrich Chemical Co. | 5 |
| imidazolium chloride | Aldrich Chemical Co. | 5 |
| LUVIQUAT FC 905 copolymer | BASF | 5 |
| Acid Yellow 23 dye | Warner & Jenkinson | 5 |

The ink composition thus prepared was hand coated onto Hammermill Tidal DP paper with a #7 Meier rod. The image dried in 2 seconds and exhibited an optical density of 1.11. The image was subsequently washed in water for 20 seconds, after which the optical density was 0.93. Wet smear was barely detectable.

The process was repeated with Xerox® Image Series LX paper. The image dried in 10 seconds and exhibited an optical density of 1.16. The image was subsequently washed in water for 20 seconds, after which the optical density was 0.95.

EXAMPLE XXXVII

An ink composition was prepared by simple mixing of the following ingredients:

| Ingredient | Supplier | Amount (wt. %) |
|---|---|---|
| deionized water | — | 48 |
| 2-pyrrolidinone | Aldrich Chemical Co. | 20 |
| sulfolane* | Phillips Petroleum Co. | 20 |
| imidazolium chloride | Aldrich Chemical Co. | 5 |
| LUVIQUAT FC 905 copolymer | BASF | 2 |
| Acid Yellow 23 dye | Warner & Jenkinson | 5 |

*containing 95 wt. % sulfolane and 5 wt. % water

The ink composition thus prepared was hand coated onto Xerox® 4024 DP paper with a #7 Meier rod. The image dried in 37 seconds and exhibited an optical density of 1.23. The image was subsequently washed in water for 20 seconds, after which the optical density was 0.95.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (1) water; (2) a nonpolymeric salt comprising at least one cation and at least one anion; (3) an anionic dye; and (4) a polyquaternary amine compound, wherein the salt has a cation selected from the group consisting of alkali metal ions, alkaline earth ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2) octane, choline,

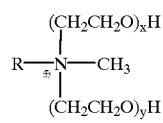

wherein R is a long chain alkyl group with 12 carbon atoms, x and y are integers of 0, 1, or 2 representing the number of ethoxy groups, wherein x+y=2, and mixtures thereof.

2. An ink composition according to claim 1 wherein the salt is present in the ink in an amount of from about 0.01 to about 50 percent by weight of the ink.

3. An ink composition according to claim 1 wherein the polyquaternary amine compound is present in the ink in an amount of from about 0.1 to about 40 percent by weight of the ink.

4. An ink composition according to claim 1 further containing a material selected from the group consisting of (a) sulfolane; (b) butyl carbitol; (c) monoether glycols; (d) cyclohexylpyrrolidinone; (e) formamide; (f) dimethyl sulfoxide; and (g) mixtures thereof.

5. An ink composition according to claim 1 which is substantially free of sulfolane and urea.

6. An ink composition according to claim 1 containing dye molecules having anionic groups thereon and a polyquaternary amine compound having quaternary amine groups thereon, wherein the polyquaternary amine compound is present in the ink in an amount such that the number of quaternary amine groups on the polyquaternary amine molecules in the ink exceeds the number of anionic groups on the dye molecules in the ink.

7. A process which comprises (i) incorporating into an ink jet printing apparatus an ink composition according to claim 1; and (ii) causing droplets of the ink composition to be ejected in an imagewise pattern onto a substrate.

8. A process according to claim 7 wherein the printing apparatus employs a thermal ink jet process wherein the ink in the nozzles is selectively heated in an imagewise pattern, thereby causing droplets of the ink to be ejected in imagewise pattern.

9. A process according to claim 7 wherein the salt in the ink is volatilized subsequent to printing.

10. A process according to claim 9 wherein the salt is selected from the group consisting of ammonium salts and mixtures thereof.

11. A process according to claim 7 wherein the printing apparatus employs an acoustic ink jet process wherein droplets of the ink are caused to be ejected in imagewise pattern by acoustic beams.

12. An ink composition according to claim 1 wherein the salt contains anions selected from the group consisting of chloride, bromide, iodide, sulfate, carboxylate, carbonate, nitrate, perchlorate, acetylacetonate, squarate, hexane sulfonate, and mixtures thereof, and wherein the salt contains cations selected from the group consisting of alkali metal ions, alkaline earth ions, ammonium ions, and mixtures thereof.

13. An ink composition according to claim 1 wherein the salt contains anions selected from the group consisting of chloride, bromide, iodide, sulfate, carboxylate, carbonate, nitrate, perchlorate, acetylacetonate, squarate, hexane sulfonate, and mixtures thereof, and wherein the salt contains cations selected from the group consisting of $Li^+$, $Na^+$, $K^+$, $Mg^{2+}$, $Ca^{2+}$, $NH_4^+$, $N(CH_3)_4^+$, $H_3NCH_2CH_2NH_3^{2+}$, $(H_3C)_3NCH_2CH_2N(CH_3)_3^{2+}$, imidazolium, quaternized 1,4-diazabicyclo(2.2.2)octane, choline,

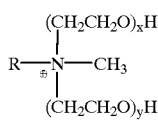

wherein R is a long chain alkyl group with 12 carbon atoms, x and y are integers of 0, 1, or 2 representing the number of ethoxy groups, wherein x+y=2, and mixtures thereof.

14. An ink composition which comprises (1) water; (2) a nonpolymeric salt comprising at least one cation and at least one anion; (3) an anionic dye; and (4) a polyquaternary amine compound selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

15. An ink composition which comprises (1) water; (2) a nonpolymeric salt comprising at least one cation and at least one anion; (3) an anionic dye; and (4) a polyquaternary amine compound, wherein the salt contains anions selected from the group consisting of chloride, bromide, iodide, sulfate, acetate, propionate, hexane sulfonate, carbonate, nitrate, perchlorate, acetylacetonate, squarate, and mixtures thereof.

16. An ink composition which comprises (1) water; (2) a nonpolymeric salt comprising at least one cation and at least one anion; (3) an anionic dye; and (4) a polyquaternary amine compound, wherein the salt contains cations selected from the group consisting of alkali metal ions, alkaline earth ions, ammonium ions, and mixtures thereof.

17. An ink composition which comprises (1) water; (2) a nonpolymeric salt comprising at least one cation and at least one anion, (3) an anionic dye; and (4) a polyquaternary amine compound, wherein the salt contains cations selected from the group consisting of $Li^+$, $Na^+$, $K^+$, $Mg^{2+}$, $Ca^{2+}$, $NH_4^+$, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octane, choline,

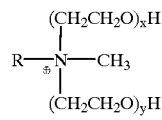

wherein R is a long chain alkyl group with 12 carbon atoms, x and y are integers of 0, 1, or 2 representing the number of ethoxy groups, wherein x+y=2, and mixtures thereof.

18. An ink composition prepared by admixing water, a nonpolymeric salt comprising at least one cation and at least one anion, an anionic dye, and a polyquaternary amine compound, wherein the salt has a cation selected from the group consisting of alkali metal ions, alkaline earth ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octone, choline,

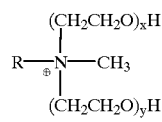

wherein R is a long chain alkyl group with 12 carbon atoms, x and y are integers of 0. 1, or 2 representing the number of ethoxy groups, wherein x+y=2, and mixtures thereof.

19. An ink composition which comprises (1) water; (2) a nonpolymeric salt comprising at least one cation and at least one anion; and (3) a colorant comprising an anionic dye complexed with a polyquaternary amine compound, wherein the salt has a cation selected from the group consisting of alkali metal ions, alkaline earth ions, ammonium ions, $N(CH_3)_4^+$, $H_3NCH_2CH_2NH_3^{2+}$, $(H_3C)_3NCH_2CH_2N(CH_3)_3^{2+}$, quaternized 1,4-diazabicyclo(2.2.2)octane, choline,

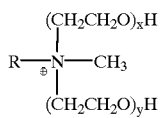

wherein R is a long chain alkyl group with 12 carbon atoms, x and y are integers of 0, 1, or 2 representing the number of ethoxy groups, wherein x+y=2 and mixtures thereof.

20. An ink composition which comprises (1) water; (2) a nonpolymeric salt comprising at least one cation and at least one anion; and (3) a colorant comprising an anionic dye complexed with a polyquaternary amine compound selected from the group consisting of polydiallyl ammonium compounds, polyquaternized polyvinylamines, polyquoternized polyallylamines, epichlorohydrin/amine copolymers, cationic amido amine copolymers, copolymers of vinyl pyrrolidinone and a vinyl imidozolium salt, and mixtures thereof.

* * * * *